(12) United States Patent
Walker et al.

(10) Patent No.: US 7,587,334 B2
(45) Date of Patent: Sep. 8, 2009

(54) METHOD AND SYSTEM FOR PROCESSING SUPPLEMENTARY PRODUCT SALES AT A POINT-OF-SALE TERMINAL

(75) Inventors: Jay S. Walker, Ridgefield, CT (US); James A. Jorasch, Stamford, CT (US); Andrew S. Van Luchene, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 365 days.

(21) Appl. No.: 10/625,089

(22) Filed: Jul. 22, 2003

(65) Prior Publication Data

US 2005/0075935 A1 Apr. 7, 2005

Related U.S. Application Data

(63) Continuation of application No. 09/442,754, filed on Nov. 12, 1999, now Pat. No. 6,598,024, which is a continuation of application No. 08/920,116, filed on Aug. 26, 1997, now Pat. No. 6,119,099, which is a continuation-in-part of application No. 08/822,709, filed on Mar. 21, 1997, now Pat. No. 6,267,670.

(51) Int. Cl.
*G06Q 20/00* (2006.01)
*A63F 3/06* (2006.01)
*A63F 9/24* (2006.01)
*G06F 17/00* (2006.01)
*G06F 19/00* (2006.01)

(52) U.S. Cl. .............................. 705/16; 463/17; 463/16; 463/25; 463/26; 273/269

(58) Field of Classification Search .................. 705/16; 273/269; 463/16, 17, 25, 26
See application file for complete search history.

(56) References Cited

U.S. PATENT DOCUMENTS

RE25,600 E   6/1964 Goldwater et al.

(Continued)

FOREIGN PATENT DOCUMENTS

DE   40 09 980 A1   1/1991

(Continued)

OTHER PUBLICATIONS

The Economist, Head I win, Tails you lose, Business; p. 74, 1992.*

(Continued)

*Primary Examiner*—Calvin L Hewitt, II
*Assistant Examiner*—Charles C Agwumezie
(74) *Attorney, Agent, or Firm*—Walker Digital Management, LLC

(57) ABSTRACT

A POS terminal determines an upsell to offer in exchange for the change due to a customer in connection with a purchase. The point-of-sale terminal preferably maintains a database of at least one upsell price and a corresponding upsell to offer a customer in exchange for the change due to him. If the customer accepts the upsell, the cashier so indicates by pressing a selection button on the POS terminal. The required payment amount for the customer to pay is then set equal to the rounded price, rather than the purchase price. Thus, the customer receives the upsell in exchange for the coins due to him, and the coins need not be exchanged between the customer and the POS terminal.

17 Claims, 17 Drawing Sheets

U.S. PATENT DOCUMENTS

| | | |
|---|---|---|
| 3,222,189 A | 12/1965 | Perrozzi |
| 3,573,747 A | 4/1971 | Adams et al. |
| 3,637,999 A | 1/1972 | Pappas |
| 4,030,632 A | 6/1977 | Harashima |
| 4,108,361 A | 8/1978 | Krause |
| 4,120,452 A | 10/1978 | Kimura et al. |
| 4,323,770 A | 4/1982 | Dieulot et al. |
| 4,441,160 A | 4/1984 | Azcua et al. |
| 4,494,197 A | 1/1985 | Troy et al. |
| 4,500,880 A | 2/1985 | Gomersall |
| 4,669,730 A | 6/1987 | Small |
| 4,677,553 A | 6/1987 | Roberts et al. |
| 4,689,742 A | 8/1987 | Troy et al. |
| 4,723,212 A | 2/1988 | Mindrum et al. |
| 4,760,247 A | 7/1988 | Keane et al. |
| 4,764,666 A | 8/1988 | Bergeron |
| 4,815,741 A | 3/1989 | Small |
| 4,825,045 A * | 4/1989 | Humble ............... 235/383 |
| 4,832,341 A | 5/1989 | Muller et al. |
| 4,839,507 A | 6/1989 | May |
| 4,854,590 A | 8/1989 | Jolliff et al. |
| 4,859,838 A | 8/1989 | Okiharu |
| 4,876,592 A | 10/1989 | Von Kohorn |
| 4,882,473 A | 11/1989 | Bergeron |
| 4,902,880 A * | 2/1990 | Garczynski et al. ......... 235/375 |
| 4,908,761 A | 3/1990 | Tai |
| 4,910,672 A | 3/1990 | Off et al. |
| 4,922,522 A | 5/1990 | Scanlon |
| 4,937,853 A | 6/1990 | Brule et al. |
| 4,973,952 A | 11/1990 | Malec et al. |
| 4,982,337 A | 1/1991 | Burr et al. |
| 4,993,714 A | 2/1991 | Golightly |
| 5,025,372 A | 6/1991 | Burton et al. |
| 5,056,019 A | 10/1991 | Schultz et al. |
| 5,119,295 A | 6/1992 | Kapur |
| 5,128,862 A | 7/1992 | Mueller |
| 5,132,914 A | 7/1992 | Cahlander |
| 5,172,328 A | 12/1992 | Cahlander et al. |
| 5,173,851 A | 12/1992 | Off et al. |
| 5,177,342 A | 1/1993 | Adams |
| 5,192,854 A | 3/1993 | Counts |
| 5,193,056 A | 3/1993 | Boes |
| 5,201,010 A | 4/1993 | Deaton et al. |
| 5,216,595 A | 6/1993 | Protheroe |
| 5,223,698 A | 6/1993 | Kapur |
| 5,231,569 A | 7/1993 | Myatt et al. |
| 5,235,509 A | 8/1993 | Mueller et al. |
| 5,239,165 A | 8/1993 | Novak |
| 5,243,515 A | 9/1993 | Lee |
| 5,245,533 A | 9/1993 | Marshall |
| 5,256,863 A | 10/1993 | Ferguson et al. |
| 5,260,553 A | 11/1993 | Rockstein et al. |
| 5,262,941 A | 11/1993 | Saladin et al. |
| 5,269,521 A | 12/1993 | Rossides |
| 5,274,547 A | 12/1993 | Zoffel et al. |
| 5,283,731 A | 2/1994 | Lalonde et al. |
| 5,287,268 A | 2/1994 | McCarthy |
| 5,297,026 A | 3/1994 | Hoffman |
| 5,297,031 A | 3/1994 | Gutterman et al. |
| 5,302,811 A | 4/1994 | Fukatsu |
| 5,305,195 A | 4/1994 | Murphy |
| 5,309,355 A | 5/1994 | Lockwood |
| 5,327,508 A | 7/1994 | Deaton |
| D351,166 S | 10/1994 | Wan |
| 5,353,218 A | 10/1994 | DeLapa et al. |
| 5,353,219 A | 10/1994 | Mueller et al. |
| 5,355,327 A | 10/1994 | Stent |
| 5,371,345 A | 12/1994 | LeStrange et al. |
| 5,371,796 A | 12/1994 | Avarne |
| 5,380,991 A | 1/1995 | Valencia et al. |
| 5,398,932 A | 3/1995 | Eberhardt et al. ....... 273/138 A |
| RE34,915 E | 4/1995 | Nichtberger |
| 5,408,210 A | 4/1995 | Oka |
| 5,417,424 A | 5/1995 | Snowden et al. ........ 273/138 A |
| 5,420,606 A | 5/1995 | Begum et al. |
| 5,428,606 A | 6/1995 | Moskowitz |
| 5,440,108 A | 8/1995 | Tran |
| 5,450,938 A | 9/1995 | Rademacher |
| 5,459,306 A | 10/1995 | Stein et al. |
| 5,464,971 A | 11/1995 | Sutcliffe et al. |
| 5,465,085 A | 11/1995 | Caldwell |
| 5,466,919 A | 11/1995 | Hovakimian |
| 5,476,259 A | 12/1995 | Weingardt |
| 5,481,094 A | 1/1996 | Suda et al. |
| 5,491,326 A | 2/1996 | Marceau et al. |
| 5,502,636 A | 3/1996 | Clarke |
| 5,504,475 A | 4/1996 | Houdou et al. |
| 5,504,675 A | 4/1996 | Cragun et al. |
| 5,510,979 A | 4/1996 | Moderi et al. |
| 5,521,364 A | 5/1996 | Kimura et al. |
| 5,526,257 A | 6/1996 | Lerner |
| 5,528,490 A | 6/1996 | Hill |
| 5,537,314 A | 7/1996 | Kanter |
| 5,539,189 A | 7/1996 | Wilson |
| 5,544,044 A | 8/1996 | Gerbaulet |
| 5,557,513 A | 9/1996 | Frey et al. |
| 5,564,546 A | 10/1996 | Molbak et al. |
| 5,572,653 A | 11/1996 | DeTemple et al. |
| 5,576,951 A | 11/1996 | Lockwood |
| 5,581,064 A | 12/1996 | Riley et al. |
| 5,583,763 A | 12/1996 | Atcheson et al. |
| 5,592,375 A | 1/1997 | Salmon et al. |
| 5,592,376 A | 1/1997 | Hodroff et al. |
| 5,602,377 A | 2/1997 | Beller et al. |
| 5,604,343 A | 2/1997 | Curry |
| 5,611,052 A | 3/1997 | Dykstra et al. |
| 5,612,868 A | 3/1997 | Off et al. |
| 5,615,269 A | 3/1997 | Micali |
| 5,619,558 A | 4/1997 | Jheeta |
| 5,620,079 A | 4/1997 | Molbak |
| 5,620,182 A | 4/1997 | Rossides |
| 5,621,201 A | 4/1997 | Longhans et al. |
| 5,621,640 A | 4/1997 | Burke |
| 5,621,812 A | 4/1997 | Deaton et al. |
| 5,630,103 A | 5/1997 | Smith |
| 5,632,010 A | 5/1997 | Briechle et al. |
| 5,638,457 A | 6/1997 | Deaton et al. |
| 5,642,484 A | 6/1997 | Harrison, III et al. |
| 5,642,485 A | 6/1997 | Deaton et al. |
| 5,644,723 A | 7/1997 | Deaton et al. |
| 5,649,114 A | 7/1997 | Deaton et al. |
| 5,652,421 A | 7/1997 | Veeneman et al. |
| 5,655,007 A | 8/1997 | McAllister |
| 5,664,115 A | 9/1997 | Fraser |
| 5,665,953 A | 9/1997 | Mazzamuto et al. |
| 5,687,322 A | 11/1997 | Deaton et al. ............... 395/214 |
| 5,694,546 A | 12/1997 | Reisman |
| 5,710,887 A | 1/1998 | Chelliah |
| 5,717,866 A | 2/1998 | Naftzger |
| 5,724,886 A | 3/1998 | Ewald et al. |
| 5,759,101 A | 6/1998 | Von Kohorn |
| 5,772,510 A | 6/1998 | Roberts ...................... 463/17 |
| 5,774,868 A | 6/1998 | Cragun et al. |
| 5,794,210 A | 8/1998 | Goldhaber et al. |
| 5,806,045 A | 9/1998 | Biorge et al. |
| 5,822,735 A | 10/1998 | Naftzger |
| 5,822,736 A | 10/1998 | Hartman |
| 5,832,457 A | 11/1998 | O'Brien et al. |
| 5,845,259 A | 12/1998 | West et al. |
| 5,845,263 A | 12/1998 | Camaisa |
| 5,845,276 A | 12/1998 | Emerson |
| 5,857,175 A | 1/1999 | Day et al. |
| 5,869,826 A | 2/1999 | Eleftheriou |
| 5,884,272 A | 3/1999 | Walker et al. |

| | | | |
|---|---|---|---|
| 5,890,718 A | 4/1999 | Byon | |
| 5,923,016 A | 7/1999 | Fredregill et al. | |
| 5,924,077 A | 7/1999 | Beach et al. | |
| 5,926,796 A | 7/1999 | Walker et al. | |
| 5,930,771 A | 7/1999 | Stapp | |
| 5,946,665 A | 8/1999 | Suzuki et al. | |
| 5,966,695 A | 10/1999 | Melchione et al. | |
| 5,974,399 A | 10/1999 | Giuliani et al. | |
| 5,999,914 A | 12/1999 | Blinn et al. | 705/26 |
| 6,014,634 A | 1/2000 | Scroggie et al. | |
| 6,014,641 A | 1/2000 | Loeb et al. | |
| 6,021,390 A | 2/2000 | Satoh et al. | |
| 6,024,288 A | 2/2000 | Gottlich et al. | |
| 6,029,153 A | 2/2000 | Bauchner et al. | |
| 6,039,244 A | 3/2000 | Finsterwald | |
| 6,064,987 A | 5/2000 | Walker et al. | |
| 6,070,147 A | 5/2000 | Harms et al. | |
| 6,080,062 A | 6/2000 | Olson | 463/42 |
| 6,085,164 A | 7/2000 | Smith et al. | |
| 6,088,682 A | 7/2000 | Burke | |
| 6,112,191 A | 8/2000 | Burke | |
| 6,119,099 A * | 9/2000 | Walker et al. | 705/16 |
| 6,138,105 A | 10/2000 | Walker et al. | |
| 6,223,163 B1 | 4/2001 | Van Luchene | |
| 6,229,879 B1 | 5/2001 | Walker et al. | |
| 6,253,188 B1 | 6/2001 | Witek et al. | |
| 6,267,670 B1 | 7/2001 | Walker et al. | 463/17 |
| 6,292,786 B1 | 9/2001 | Deaton et al. | |
| 6,296,569 B1 | 10/2001 | Congello | |
| 6,298,329 B1 | 10/2001 | Walker et al. | |
| 6,298,331 B1 | 10/2001 | Walker et al. | |
| 6,307,958 B1 | 10/2001 | Deaton et al. | |
| 6,321,210 B1 | 11/2001 | O'Brien et al. | |
| 6,463,585 B1 | 10/2002 | Hendricks et al. | |
| 6,515,680 B1 | 2/2003 | Hendricks et al. | |
| 6,582,304 B2 * | 6/2003 | Walker et al. | 463/17 |
| 6,598,024 B1 * | 7/2003 | Walker et al. | 705/16 |
| 7,272,569 B1 | 9/2007 | Walker et al. | |
| 2003/0037041 A1 | 2/2003 | Hertz | |
| 2003/0120579 A1 | 6/2003 | Carter, III | |

FOREIGN PATENT DOCUMENTS

| | | | |
|---|---|---|---|
| EP | 0 780 788 | | 6/1967 |
| EP | 0 085 546 | | 8/1983 |
| EP | 0 109 189 | A1 | 10/1983 |
| EP | 0 512 413 | A2 | 11/1992 |
| EP | 0 512 413 | A3 | 11/1992 |
| EP | 512413 | | 11/1992 |
| GB | 1 391 060 | | 4/1975 |
| JP | 57086974 | | 5/1982 |
| JP | 357120172 | A | 7/1982 |
| JP | 590108827 | | 12/1985 |
| JP | 600251498 | | 12/1985 |
| JP | 1211170 | | 8/1989 |
| JP | 2171891 | | 7/1990 |
| JP | 2197998 | | 8/1990 |
| JP | 2278399 | | 11/1990 |
| JP | HEI 2 1989 2636700 | | 11/1990 |
| JP | HEI 2 1990-289000 | | 11/1990 |
| JP | HEI 2-289000 | | 11/1990 |
| JP | 040960900 | | 2/1992 |
| JP | 4095198 | | 3/1992 |
| JP | 4260914 | | 9/1992 |
| JP | 04314189 | | 11/1992 |
| JP | 5252363 | A | 9/1993 |
| JP | 8147545 | | 6/1996 |
| JP | 8329350 | | 12/1996 |
| JP | 09300730 | A | 11/1997 |
| JP | 10031792 | | 2/1998 |
| JP | 11-505343 | | 5/1999 |
| WO | WO 91/03789 | | 3/1991 |
| WO | WO 96/34358 | | 10/1996 |
| WO | WO 96/36926 | | 11/1996 |
| WO | WO 97/28510 | | 8/1997 |
| WO | WO 97/35441 | | 9/1997 |
| WO | WO 97/46961 | | 12/1997 |
| WO | WO 97/50064 | | 12/1997 |
| WO | WO 98/43149 | | 10/1998 |
| WO | WO 99/11006 | | 3/1999 |

OTHER PUBLICATIONS

Herman, Ken, "Auchan Cashes in on Lottery", Houston Post, Jul. 1, 1992, Section A, p. 15, col. 5.

"Georgia Almanac", Georgia Almanac, Jan. 26, 1983, BC Cycle, Section: Regional News, 2 pp.

Herman, Ken, "Lottery's losers: Small stores; Big Pots bring big Problems", Austin American-Statesman, Nov. 23, 1996, Section: News, 4 pp.

Kelsey, John and Schneier, Bruce, "Conditional Purchase Orders", Fourth AMC Conference on Computer Communications Security, ACM Press, Apr. 1997, 8 pp.

Prochaska-Cue, Kathy, "Acquiring Credit", (http //ianrwww unl edu/ IANR/PUBS/NEBFACTS/NF91-2.htm), download date: Sep. 3, 1997, 4 pp.

Website: "Welcome to Onsale", (http www onsale come) download date: Sep. 8, 1997, 15 pp.

Website: "IAO—Onsale—GSCI—Zaution—Cyberswap—Auction World", (http ww iaoauction com/about htm), download date: Sep. 8, 1997, 10 pp.

Kirk, Jim, "Digital Promotions Make Quick Point—McDonald's testing new technology on its menus", Chicago Tribune, Dec. 26, 1997, 2 pp.

"From Our Family to Yours . . . 5 Weeks of Coupon Values for a Valuable Customer!", Wakefern Food Corporation, 1998, 1 pg.

Brochure: "It's in the Bag. Introducing the Universal Holding Cabinet from Welbilt", Frymaster Corporation, 1998, 5 pp.

"Progressive Introduces Kitchen Display System (KDS) For Restaurants", PR Newswire, Jan. 23, 1998, Section: Financial News, 2 pp.

"JICC Coupon Guide Recommends Upgrades at Front End", Supermarket News, Feb. 9, 1998, Section: p. 23, ISSN: 0039-5803, 2 pp.

Livingston, Kimball, "In-Store systems, VideOcart Redux", Retail Tech Magazine, Mar. 1998, pp. 29-30, 2 pp.

Website: "Advanced Mechanics Internet Specials", (http //www metroplexweb com/advcpn2 htm), download date: Mar. 12, 1998, 4 pp.

Website: "U.P.C. Coupon Code Guidelines Manual", Uniform Code Council, Inc., (http //www uc-council org/d31-3 htm), download date: Mar. 12, 1998, 10 pp.

"New Wave Marketing", Promotion Times—An SCA Quarterly Newsletter—First Quarter, Apr. 1998, 2 pp.

Hamstra, Mark, "Segment Study: 'Made-for-you' maneuvers signal competitive shift n QSR category", Nation's Restaurant News, Apr. 13, 1998, 6 pp.

"POSitive Input; The McDonald's POS-3 System Newsletter from Olivetti Solutions/OLSY", McDonald's, Spring/Summer Edition 1998, 8 pp.

"Universal Holding Cabinet Rollout Program", H & K Dallas Inc., Winter 1998, 6 pp.

"The Northwest German State Lottery—Your Invitation to Play", (http //www germanstatelottery com/invitation html), download date: May 14, 1999, 2 pp.

"Official Lottery Rules", (http //www gloeckle com/bedingungen/ main html), download date: May 14, 1999, 5 pp.

Website: "What actually is the SKL?", (http //www gloeckle com/ das_spiel/rechts html), download date: May 14, 1999, 3 pp.

"Epson Partners With International Lottery & Totalizer Systems; Epson's New Acclaim Program Wins With Gaming Market", Business Wire, Jun. 7, 1999, 2 pp.

"The Change Game", Georgia State Lottery Ticket—Mega Millions Jackpot, Draw date Aug. 8, 2002, 1 pg.

Website: "Georgia Lottery Corporation—Change Game", (http //www Georgialottery com/lottery/changegame html), download date: Dec. 4, 2002, 1 pg.

Website: "Michigan Lottery", (http www Michigan gov/lottery/ 0,1607,7-110-812__21193__21321—,00 html), download date: Dec. 4, 2002, 3 pp.
Website: "The Change Game—Turning Loose Change Into Lottery Dollars", (http www berschgaming com/about_the_game htm), download date: Dec. 4, 2002.
PCT Written Opinion for Application No. PCT/US98/05787 dated Jul. 29, 1999, 11 pp.
PCT International Search Report for Application No. PCT/US98/ 05787 dated May 12, 1999, 2 pp.
Rehayem, Gilbert, "Opinion: X-Press Betting", Information Systems & Technology, Ontario Lottery Corp.
Brochure: "Reaching Out In New Directions", First Data Corporation, Merchant Services, undated.
"Cape Town", Reuters Ltd, Nov. 8, 1979, PM Cycle.
"Save the mark", Financial Times (London), Feb. 1, 1983, Section I, Men & Matters at p. 12.
Cook, Louise, "ConsumerWatch: Clip, Snip, Save", The Associated Press, Mar. 12, 1984, Business News Section.
"Major Appliances: Tappan unveils microwave oven feature preprogrammed controls.", HFD, Sep. 10, 1984, p. 103.
"POS spectrum: a lottery looks to POS for growth", UMI, Inc., POS News, Jan. 1989, vol. 5, No. 7, p. 8, ISSN: 0896-6230, CODEN: BHORAD.
Kuttner, Robert, "Computers May Turn The World Into One Big Commodities Pit", Business Week, Sep. 11, 1989, Section: Economic Viewpoint, No. 3123 at Pg.
Schrage, Michael, "An Experimental In Economic Theory; Labs Testing Real Markets", The Record, Nov. 26, 1989, Section: Business at p. B01.
"Let's Play the Cash Register Receipts Lottery", The New York Times, Dec. 25, 1990, Section 1, p. 30, col. 4, Editorial Desk.
Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082.
"Philips offers customers financing through Citicorp; Philips Medical Systems North America, Citicorp North America Inc." Health Industry Today, Jun. 1991, Section: vol. 54, No. 6, p. 4, ISSN: 0745-4678.
Pelline, Jeff, "Travelers Bidding On Airline Tickets SF firm offers chance for cut-rate fares" The San Francisco Chronicle, Aug. 19, 1991, Sections: News at p. A4.
Del Rosso, Laura, "Ticket-bidding firm closes its doors; Marketel International; Brief Article", Travel Weekly, Mar. 12, 1992, Section: vol. 51, No. 21, p. 1, ISSN: 0041-2082.
"Coupons get serious; supermarkets use barcodes to prevent misredemptions", Chain Store Age Executive with Shopping Center Age, Oct. 1992, Section: vol. 68, No. 10, p. 68, ISSN: 0193-1199.
"Winn-Dixie/The Salvation Army Report Contributions For War Against Hunger", PR Newswire, Jun. 10, 1993, Section: Financial News.
Jones, Jeanne, "Data Readers Streamline Management; Scanner Technology Aids Retailers As Well As Plants, Wholesalers,", The Houston Post, Jun. 26, 1994, Section: Business at p. D1.
Fiorini, Phillip, "'No Place For Penny?'/Smallest coin doesn't make cents to some", USA Today, Jul. 29, 1994, Section: News at p. 1A.
Smith, Alison, "Survey of UK Consumer Credit and Asset Finance", Financial Times, Nov. 3, 1994, Section: p. VI.
Andreoli, Tom et al., "Cash Machines Offer A Whole Lotto Money For Withdrawl; An Unfortunate Juxtaposition; Block That Metaphor!; Something Street Talk; Fishy In Springfiled; State Street Sears?; Champion As Underdog; A 'Whole Language' Graduate", Crain's Chicago Business, Jun. 19, 1995, Section: News at p. 8.
"Spain: BBV launches new card", Cards International, Jun. 22, 1995 at p. 5.
Greene, Jan, "Farm bills please assns; National Grocers Association", Supermarket News, vol. 35, Load-Date: Jun. 30, 1995.
Knippenberg, Jim, "Psst! Will local radio empires strike back?", The Cincinnati Enquirer, Jul. 23, 1995, Section: Tempo at p. F01.
Silverman, Gene, "Planning and using infomercial campaigns effectively", Direct Marketing, Sep. 1995, vol. 58, No. 5, p. 32(3).
Brochure, "Cyber Bid", Net Fun Ltd., Copyright 1996.

McKinney, Jeff, "Merchant program could pay off for Provident", The Cincinnati Enquirer, Mar. 24, 1996, Section: Financial, p. E02.
Raab, David M., "Package Aids Catalog Management", DM News, Apr. 22, 1996, Section: Software Review, p. 14.
Hadley, Kimberly, "Pastors praying anti-arson effort will burn bias", The Nashville Banner, Jul. 26, 1996, Section: News at p. A13.
Gapper, John, "NatWest reports rise in bad debt", Financial Times, Jul. 31, 1996, Section: News: UK; at p. 09.
"Lynx Technology: Lynx to provide business leasing programme through Schroder Leasing", M2 Presswire, Aug. 9, 1996.
Taylor, Paul, "Towards a dream market", Financial Times (London), Sep. 4, 1996, Section: Survey—FT IT; at p. 03.
"Bigger Plans (Provident Bank, issuer of MeritValue customer loyalty card, plans to offer program in 25 cities in six months)", Card Fax, Oct. 7, 1996, vol. 96, No. 178, p. 2.
Fickenscher, Lisa, "Amex to Start Free Rewards Program with Discounts on Merchandise", The American Banker, Oct. 18, 1996, Section: Credit/Debit/ATMs, p. 10.
Fitzgerald, Kate, "Amex Program Moves Loyalty to Next Level: Custom Extras Finds a Medium Customers Can't Ignore: Billing Statements", Adve''rtising Age, Nov. 4, 1996, Section: News, p. 2.
Bonnici, Joseph et al., "Consumer issues in coupon usage: An exploratory analysis", Journal of Applied Business Research, Winter 1996/ 1997, Section: vol. 13, No. 1, pp. 31-40, ISSN: 0892-7626, CODEN: JPBEBK.
Quittner, Jeremy, "Ohio's Provident brings its discount card to Fla.", American Banker, Feb. 11, 1997, vol. 162, Issue 28, p. 11, 1/3p., ISSN: 0002-7561.
Symons, Allene, "Lucky, Sav-on debut Rewards Card.", Drug Store News, Feb. 17, 1997, vol. 19, Issue 4, p3, 2p, 1c, ISSN: 0191-7587.
Mckeveny, Alexander, "Giving them a good reason.", Bank Marketing, Mar. 1997, vol. 29, Issue 3, p37, 4p, 4c, ISSN: 0888-3149.
Singletary, Michelle, "Electronic World, Unchecked Problem? U.S. Move to Paperless Payments Raises Worries About Those Who Don't Use Banks", The Washington Post, Mar. 4, 1997, Section: Financial at p. C01.
Fickenscher, Lisa, "Merchant: American Express Seeks to Mine Its Data on Cardholder Spending Patterns", The American Banker, Mar. 24, 1997, Section: Credit/Debit/ATMs, p. 20.
"Dispensing the Future", Electronic Payments International, May 1997, Section: Feature, p. 12.
"Avco Financial Services", National Home Furnishing Association, (http //www homefurnish comNHFA/avco htm), download date: May 23, 1997.
Website, "Catalina Marketing Corporation", (http //catalinamktg com/prodcdir htm), download date: May 29, 1997.
Riordan, Teresa, "Patents; A novel approach to making a better spermicide harks back to some old-fashioned methods", The New York Times, Jun. 9, 1997, Section D, p. 2, col. 1, Business/Financial Desk.
"Industry Briefs", Card News, Jun. 9, 1997, Section: vol. 12, No. 11.
Nairn, Geoff, "The key to your identity: Falling costs will allow fingerprint verification to be widely used, reports Geoff Nairn", Financial Times (London), Jul. 15, 1997, Section: Technology; at p. 12.
"The United Computer Exchange, How It All Works", (http //www uce com/howitworks html), download date: Jul. 23, 1997.
"Classified 2000: The Internet Classifieds", Classifieds2000, Inc., (http //www classifieds2000 com/cgi-cls/Display exe?C2K+aboutus), download date: Aug. 6, 1997.
"General trading information and terms provided by tradingfloor. com", (http //www tradingfloor com/info htm), download date: Aug. 14, 1997.
"NASDAQ", Information Sheet, (http //home axford com/corfin/ corf11 htm), download date: Aug. 15, 1997.
Hoeschen, Brad, "Brookfield Square hopes mall card strikes a chord", Business Journal-Milwaukee, Sep. 12, 1997, Section: vol. 14, No. 50, p. 19.
Website: "NCR 7452 Workstation—Beyond Traditional POS", (http //www ncr com/product/retail/products/catalog/7452 shtm), download date: Sep. 23, 1997.
"NCR 7453 PC-Based Point-of-Sale Solution", NCR Corporation, Copyright 1998.

Brochure, "For the Crew & the Customer: The Best Drive-Thru & Grill Service", Olivetti North America, Winter 1998.

"Examiner's Affidavit", Feb. 22, 2001.

Anonymous, Point-of-sale: cash-back feature at the point of sale emerges as new trend in EFT industry. Apr. 18, 1988, 1 pg.

POS spectrum: California bets on POS to spur its lottery sales POS News, Aug. 1990, vol. 7, Issue 3, 1 pg.

"Sharing the winnings", Boston Globe, Apr. 2, 1995, 1 pg.

Downing, Neil, "Money Line: IF 12 people share a winning ticket, they'll have to share a single check", Providence Journal - Bulletin, Oct. 17, 1995, 3 pp.

Glickman, Jeff, 10 Infomercial Facts You Need to Know (Supplement: The Infomercial - Special Sourcebook Issue), Adweek Eastern Edition, vol. 34, No. 10, Mar. 8, 1993, 6 pp.

Goodstein, Ronald C., "UPC scanner pricing systems: Are they accurate?", Journal of Marketing, Apr. 1994, vol. 58, No. 2, pp. 20-30, ISSN: 0022-2429, 17 pp.

Stankevich, Debby Garbato, "Cook's Warehouse sets heavy-gauge nonstick.", HFN The Weekly Newspaper for the Home Furnishing Network, Aug. 14, 1995, Section: vol. 69, No. 33, 2 pp.

Rodwin, Marc A., "Consumer protection and managed care: The need for organized consumers", Health Affairs, Fall 1996, vol. 15, No. 3, pp. 110-123, ISSN: 0278-2715, CODEN: FRBPBN, 11 pp.

Kennedy, Doug, "Train front desk staff in sales; hotel industry", Hotel & Motel Management, Mar. 3, 1997, Section: No. 4, vol. 212, ISSN: 0018-6082, 2 pp.

"Magazine Subscription Sales Center - Where Buying Subscriptions is Easy!", Customer Service Information, Interactive Magazine Sales, Inc., e-mail: aim@panix.com, 2 pp.

Howland, Jennifer, "National Distribution: Scanning the Future", Folio: The Magazine for Magazine Management, Feb. 1985, Section: vol. 14, p. 69, ISSN: 0046-4333, 11pp.

Wood, Wally, "Circulation Marketing: Let Your Magazine Do the Selling", Folio: The Magazine for Magazine Management, Jun. 1985, vol. 14, p. 78, ISSN: 0046-4333, 10pp.

Reese, Diane, "Revitalizing Single-Copy Sales", Folio: The Magazine for Magazine Management, Feb. 1986, vol. 15, p. 84, ISSN: 0046-4333, 14 pp.

Joyce, Walter, "Muscular Merchandising: column", Folio: The Magazine for Magazine Management, Jun. 1986, vol. 15, p. 124, ISSN: 0046-4333, 5pp.

"Phoenix Papers to Sell Merchandise to Build Awareness", Editor & Publisher, Sep. 17, 1988, vol. 121, Issue 38, p. 23, ISSN: 0013-094X, 2pp.

Donaton, Scott, "Gift Subscriptions Find Retail Niche", Advertising Age, Jul. 16, 1990, Section: News at p. 37, 2pp.

Guy, Pat, "A Gift Off the Rack: Mag Subscription", USA Today, Dec. 19, 1990, Section: Money at p. B2, 2pp.

Jaben, Jan, "Magazine Gift-giving Made Simple at Retail Outlets; Time Inc., Hearst, Meredith Test Subscriber Systems' Method of Selling Gift Subscriptions; News" Feb. 15, 1991, vol. 3, No. 2, p. 15, ISSN: 1043-8688, 3pp.

Horton, Liz, "Holiday Gift Subs Up, Some Due to Novel Promotions", Folio: The Magazine for Magazine Management, Feb. 1, 1992, Section: vol. 21, No. 2, p. 39, ISSN: 0046-4333, 1 pg.

Carlson, Lynn, "Decreasing Your Direct-Mail Costs", Folio: The Magazine for Magazine Management, Sep. 1, 1992, vol. 21, Issue 9, pp. 81-82, ISSN: 0046-4333, 3pp.

Manly, Lorne, "A Newsstand for the Electronic Age", Folio: The Magazine for Magazine Management, Sep. 15, 1993, vol. 22, No. 16, p. 17, ISSN: 0046-4333, 3pp.

Hochwald, Lambeth, "Sub Sources that Break With Tradition", Folio: The Magazine for Magazine Management, May 1, 1994, vol. 23, Issue 8, pp. 46-48, ISSN: 0046-4333, 4pp.

Love, Barbara, "Selling Subscriptions at Newsstands", Folio: The Magazine for Magazine Management, Jun. 1, 1994, vol. 23, Issue 10, p. 10, ISSN: 0046-4333, 2pp.

Cyr, Diane, "Distribution Woes; Declining Newsstand Circulation; Includes Related Article On Preventing Newsstand Fraud", Folio: The Magazine for Magazine Management, Jan. 1995, vol. 23, No. 19, p. 170, ISSN: 0046-4333, 5pp.

Love, Barbara, "Folio: Plus Circulation; Techniques for Managing Magazine Circulation", Folio: The Magazine for Magazine Management, Jan. 1995, vol. 23, No. 19, p. 159, ISSN: 0046-4333, 2pp.

Kelly, Keith J., "Hearst Opens a Cyberspace Newsstand", Advertising Age, Jan. 30, 1995, vol. 66, Issue 5, p. 14, ISSN: 0001-8899, 2pp.

Schnuer, Jenna, "Overnight Options Add to Distribution Mix; Distribution of "Inside Sports" Magazine", Folio: The Magazine for Magazine Management, Mar. 1, 1995, vol. 24, No. 4, p. 19, ISSN: 0046-4333, 2pp.

Kelly, Keith J., "Publishers Pine for Cyber-Profits", Time, Inc., Mar. 13, 1995, vol. 66, Issue 11, pp. S-22, ISSN: 0001-8899, 1pg.

Wilson, Steve, "Out of Print - but Not Business; Magazines Move Away From Print in Favor of Electronic Publishing", Folio: The Magazine for Magazine Management, May 1, 1995, vol. 24, No. 8, p. 22, ISSN: 0046-4333, 2pp.

Hochwald, Lambeth, "Postal Blues: Circulators Cope With the Rate Crunch", Folio: The Magazine for Magazine Management, May 1, 1995, vol. 24, No. 8, p. 54, ISSN: 0046-4333, 3pp.

"Tretorn Offers Magazine Promo", AdWeek, May 1, 1995, Section: Newswire, 1pg.

"Lotto World", MediaWeek, May 8, 1995, vol. 5, No. 19 at p. 16, 1pg.

Graham, Anne, "Nonmember Subs - Or Not? Non-Member Subscriptions to Association Magazines; Includes Tips from Publishers", Folio: The Magazine for Magazine Management, Jun. 1, 1995, vol. 24, No. 10, p. 47, ISSN: 0046-4333, 4pp.

Miller, Paul, "Magazine Deal Lacks Catalog Appeal; Brief Article", Folio: The Magazine for Magazine Management, Jun. 15, 1995, vol. 24, No. 11, p. 30, ISSN: 0046-4333, 2pp.

Wilson, Steve, "Directory Assistance: A Buyer's Guide Can Give You a Big Boost in Revenue and Attract New Advertisers and Subscribers", Folio: The Magazine for Magazine Management, Oct. 1, 1995, vol. 24, No. 16, p. 40, ISSN: 0046-4333, 6pp.

Garratt, David, "What Premium on On-Cover Premiums?", Folio: The Magazine for Magazine Management, Oct. 1, 1995, vol. 24, No. 16, p. 53, ISSN: 0046-4333, 3pp.

"HFS Incorporates and Hatches Filipacchi Magazines; Announce Launch of Century 21 House & Home Magazine . . . ", Business Wire, Nov. 20, 1995, 2pp.

Hochwald, Lambeth, "Circulation Secrets: Nine Steps to a Successful Circulation Launch Strategy Includes List of Resources", Folio: The Magazine for Magazine Management, Feb. 1, 1996, vol. 25, No. 2, p. 53, ISSN: 0046-4333, 5pp.

Kerwin, Anne Marie, "Notably at the Newsstand: InStyle, Financial World Push for Greater Single-Copy Sales", Inside Media, Feb. 7, 1996, vol. 8, No. 3, p. 26, ISSN: 1046-5316, 2pp.

Adams, Mark, "Capell Reports Sales Drop at Newsstands", Mediaweek, Mar. 11, 1996, vol. 6, No. 11, p. 27, ISSN: 1055-176X, CODEN:MADEAP, 1pg.

Lang, Joan, "Round n' Round They Go", May 1, 1996, Restaurant Business, vol. 96, No. 7, pp. 132- 134, 2pp.

Schnuer, Jenna, "A World Without Magazines? Consumers Weigh In. Survey of Consumers Indicates That . . . ", Folio: The Magazine for Magazine Management, Jun. 1, 1996, vol. 25, No. 9, p. 16, ISSN: 0046-4333, 2pp.

Hodges, Jane, "WSJ Puts Squeeze on Web Subscriptions", Advertising Age, Apr. 29, 1996, vol. 67, Issue 18, p. 34, ISSN: 0001-8899, 2pp.

Tedesco, Richard, "Time Launches 'Net Subscription Service'", Broadcasting & Cable, Nov. 11, 1996, vol. 126, Issue 47, p. 65, ISSN: 1068-6827, 1pg.

Reilly, Brian, "Upselling' Strategies Hit the Net", Advertising Age's Business Marketing, Chicago, Dec. 1996, 1pg.

Webster's II, New Riverside University Dictionary, 1994, Houghton-Mifflin Company, 3pp.

"Hearst Corporation Launches 'The Multimedia Newsstand'", Link-Up, Mar./Apr. 1995, vol. 12, Issue 2, pp. 1 & 36, ISSN: 0739-988X, 1pg.

"The Super Subs", Precision Marketing, Oct. 24, 1994, No. 0, vol. 0, 5 pp.

Office Action for U.S. Appl. No. 08/920,116, dated Oct. 1, 1999, 7pp.

Notice of Allowance for U.S. Appl. No. 08/920,116, dated Oct. 25, 1999, 13pp.

Office Action for U.S. Appl. No. 09/442,754, dated Aug. 2, 2000, 10pp.
Office Action for U.S. Appl. No. 09/442,754, dated Jan. 16, 2001, 11pp.
Office Action for U.S. Appl. No. 09/442,754, dated Aug. 1, 2001, 6pp.
Notice of Allowability for U.S. Appl. No. 09/442,754, dated Dec. 7, 2001, 3pp.
Notice of Allowance for U.S. Appl. No. 09/442,754, dated Oct. 1, 2002, 7pp.
Supplemental Allowance for U.S. Appl. No. 09/442,754, dated Mar. 4, 2003, 5pp.
Decision on Appeal for U.S. Appl. No. 09/045,036 mailed Nov. 30, 2005, 14 pp.
Office Action for U.S. Appl. No. 09/045,036 mailed Jun. 25, 2002, 27 pp.
Office Action for U.S. Appl. No. 09/045,036 mailed Sep. 27, 2001, 18 pp.
Office Action for U.S. Appl. No. 09/045,036 dated Dec. 11, 2007, 9 pp.
Office Action for U.S. Appl. No. 10/642,978 mailed Aug. 1, 2006, 20 pp.
Office Action for U.S. Appl. No. 10/642,978 mailed Feb. 21, 2006, 10 pp.
Office Action for U.S. Appl. No. 10/642,978 mailed Jun. 28, 2005, 8 pp.
Office Action for U.S. Appl. No. 09/107,971 mailed Jul. 10, 2002, 30 pp.
Office Action for U.S. Appl. No. 09/107,791 mailed Feb. 2, 2004, 28 pp.
Office Action for U.S. Appl. No. 11/456,271 mailed Dec. 31, 2007, 10 pp.
Office Action for U.S. Appl. No. 09/390,430 mailed Jun. 18, 2003, 17 pp.
Office Action for U.S. Appl. No. 09/390,430 mailed Sep. 23, 2002, 17 pp.
International Search Report for PCT/US2000/21318 mailed Nov. 22, 2000, 3 pp.
Notice of Allowance for Issue Fee Due for U.S. Appl. No. 08/822,709 mailed Jan. 16, 2001, 3 pp.
Office Action for U.S. Appl. No. 08/822,709 mailed Feb. 17, 2000, 6 pp.
Office Action for U.S. Appl. No. 08/822,709 mailed Jun. 23, 1999, 5 pp.
Notice of Allowance for U.S. Appl. No. 09/836,409 mailed Jan. 13, 2003, 4 pp.
Office Action for U.S. Appl. No. 09/836,409 mailed Nov. 20, 2002, 4 pp.
Notice of Allowance for U.S. Appl. No. 09/836,409 mailed Sep. 25, 2002, 4 pp.
Notice of Allowance for U.S. Appl. No. 09/836,409 mailed May 16, 2002, 4 pp.
Office Action for U.S. Appl. No. 09/836,409 mailed Oct. 1, 2001, 6 pp.
Notice of Allowance for U.S. Appl. No. 10/424,362, mailed Nov. 11, 2004, 7 pp.
Office Action for U.S. Appl. No. 10/424,362 mailed Jun. 9, 2004, 6 pp.
Office Action for U.S. Appl. No. 10/424,362 mailed Nov. 19, 2003, 11 pp.
Notice of Acceptance for Canadian Application No. 2,284,662 dated Oct. 3, 2003, 1 pg.
Office Action for Canadian Application No. 2,284,662 mailed Jan. 29, 2003, 3 pp.
Office Action for European Application No. 98 013 082 mailed Jul. 24, 2006, 5 pp.
Translation of Office Action for Japanese Application No. 545921/98, mailed Feb. 18, 2003, 4 pp.
Translation of Office Action for Japanese Application No. 545921/98, mailed Jun. 13, 2006, 8 pp.
Translation of Office Action for Japanese Application No. 2005-230017, mailed Nov. 9, 2007, 6 pp.
Office Action for U.S. Appl. No. 09/045,386, dated Aug. 15, 2000, 10pp.
Office Action for U.S. Appl. No. 09/045,386, dated Mar. 14, 2001, 13pp.
Office Action for U.S. Appl. No. 09/045,386, dated Oct. 11, 2001, 4pp.
Office Action for U.S. Appl. No. 09/045,386, dated Jul. 1, 2002, 6pp.
Office Action for U.S. Appl. No. 09/045,386, dated Mar. 7, 2003, 7pp.
Office Action for U.S. Appl. No. 09/045,386, dated Nov. 23, 2004, 6pp.
Notice of Allowance for U.S. Appl. No. 09/045,386 dated May 23, 2007, 7 pp.
Notice of Allowance for U.S. Appl. No. 09/045,386 dated Jan. 10, 2006, 7 pp.
Supplemental Notice of Allowability for U.S. Appl. No. 09/045,386, dated Mar. 20, 2006, 3pp.
Office Action for U.S. Appl. No. 09/045,347, dated Sep. 22, 2000, 8pp.
Office Action for U.S. Appl. No. 09/045,347, dated Apr. 10, 2001, 2pp.
Office Action for U.S. Appl. No. 09/045,347, dated May 6, 1999, 6pp.
Office Action for U.S. Appl. No. 09/045,347, dated Jan. 11, 2000, 7pp.
Office Action for U.S. Appl. No. 09/933,588, dated Jan. 23, 2007, 10pp.
Office Action for U.S. Appl. No. 09/933,588, dated Aug. 28, 2006, 7pp.
Office Action for U.S. Appl. No. 09/083,689, dated Jun. 23, 1999, 11pp.
Notice of Allowability for U.S. Appl. No. 09/083,689, dated Jan. 31, 2000, 2pp.
Office Action for U.S. Appl. No. 09/083,689, dated Aug. 2, 2000, 19pp.
Office Action for U.S. Appl. No. 09/083,689, dated Jan. 16, 2001, 9pp.
Office Action for U.S. Appl. No. 09/083,689, dated Jul. 25, 2001, 9pp.
Office Action for U.S. Appl. No. 09/083,689, dated Mar. 18, 2002, 13pp.
Notice of Allowability and Fees Due for U.S. Appl. No. 09/045,518, mailed Aug. 30, 2005, 7 pp.
Notice of Allowability for U.S. Appl. No. 09/045,518, dated Feb. 3, 2005, 9 pp.
Decision on Appeal for U.S. Appl. No. 09/045,518, dated May 6, 2004, 62pp.
Office Action for U.S. Appl. No. 09/045,518, dated Apr. 5, 2002, 16pp.
Office Action for U.S. Appl. No. 09/045,518, dated Jul. 2, 2001, 12pp.
Office Action for U.S. Appl. No. 09/045,518, dated Feb. 13, 2001, 16pp.
Office Action for U.S. Appl. No. 09/045,518, dated Jun. 6, 2000, 9pp.
Office Action for U.S. Appl. No. 11/160,499 dated Nov. 15, 2007, 9pp.
Office Action for U.S. Appl. No. 11/160,499, dated Nov. 30, 2006, 5pp.
Office Action for U.S. Appl. No. 11/160,499, dated Mar. 15, 2006, 6pp.
Notice of Allowability for U.S. Appl. No. 09/076,409, dated Mar. 27, 2001, 6pp.
Office Action for U.S. Appl. No. 09/076,409, dated Jan. 5, 2000, 6pp.
Office Action for U.S. Appl. No. 09/076,409, dated Apr. 13, 1999, 5pp.
Notice of Allowability for U.S. Appl. No. 10/678,058, dated Aug. 9, 2004, 8pp.
Office Action for U.S. Appl. No. 09/643,668, dated Dec. 23, 2002, 12 pp.
Notice of Allowability for U.S. Appl. No. 09/643,688, dated Aug. 9, 2004, 5pp.
Office Action for U.S. Appl. No. 11/099,287, dated Jan. 10, 2008, 9pp.
Office Action for U.S. Appl. No. 11/099,287, dated Apr. 6, 2007, 10pp.

Office Action for U.S. Appl. No. 11/099,287, dated Jul. 12, 2006, 10 pp.
Notice of Allowability for U.S. Appl. No. 09/045,084, dated Nov. 6, 2000, 6pp.
Office Action for U.S. Appl. No. 09/045,084, dated Apr. 3, 2000, 10pp.
Office Action for U.S. Appl. No. 09/045,084, dated Sep. 1, 1999, 6pp.
Office Action for U.S. Appl. No. 09/777,297, dated Jul. 8, 2004, 6pp.
Office Action for U.S. Appl. No. 09/083,483, dated Feb. 22, 2000, 8pp.
Office Action for U.S. Appl. No. 09/083,483, dated Nov. 22, 2000, 7pp.
Notice of Allowability for U.S. Appl. No. 09/083,483 dated Feb. 12, 2001, 4 pp.
Notice of Allowance for U.S. Appl. No. 09/858,458, dated Oct. 31, 2006, 11pp.
Interview Summary for U.S. Appl. No. 09/858,458, dated Aug. 14, 2006, 3pp.
Interview Summary for U.S. Appl. No. 09/858,458, dated Aug. 9, 2006, 3pp.
Office Action for U.S. Appl. No. 09/858,458, dated Mar. 24, 2006, 10pp.
Office Action for U.S. Appl. No. 09/858,458, dated Jun. 29, 2005, 9pp.
Office Action for U.S. Appl. No. 09/858,458, dated Jan. 26, 2005, 21pp.
Notice of Allowability for U.S. Appl. No. 09/083,483, dated Aug. 10, 2006, 6pp.
Notice of Allowance for U.S. Appl. No. 09/603,677, dated Apr. 10, 2008, 5pp.
Notice of Allowance for U.S. Appl. No. 09/603,677, dated Oct. 10, 2007, 6pp.
Office Action for U.S. Appl. No. 09/603,677, dated Mar. 22, 2007, 22pp.
Office Action for U.S. Appl. No. 09/603,677, dated Dec. 14, 2004, 22pp.
Office Action for U.S. Appl. No. 09/603,677 dated Aug. 11, 2004, 31pp.
Office Action for U.S. Appl. No. 09/603,677, dated Dec. 12, 2003, 38pp.
Office Action for U.S. Appl. No. 09/603,677, dated Mar. 11, 2003, 8pp.
Notice of Allowance for U.S. Appl. No. 10/678,056 dated Oct. 30, 2007, 8pp.
Office Action for U.S. Appl. No. 11/099,287 dated Jan. 10, 2008, 9 pp.
Office Action for U.S. Appl. No. 11/099,287 dated Apr. 6, 2007, 10 pp.
Office Action for U.S. Appl. No. 11/099,287 dated Jul. 12, 2006, 7 pp.
International Search Report for Application No. PCT/US98/17287 dated Apr. 16, 1999, 2pp.
Written Opinion for Application No. PCT/US98/17287 dated Sep. 13, 1999, 5pp.
International Preliminary Examination Report for PCT/US98/17287 dated Dec. 20, 1999, 5pp.
International Search Report for PCT/US98/16985, mailed Apr. 12, 2002, 7 pp.
Office Action for Application No. PCT/US98/17274 dated Sep. 30, 2002, 2 pp.
Office Action for Application No. 200-508047 dated Apr. 2, 2002, 8 pp.
Office Action for Application No. 2299341 dated Dec. 17, 2001, 2 pp.
Office Action for Application No. 2299341 dated Feb. 3, 2004, 7 pp.
International Search Report for Application No. PCT/US98/17274 dated Apr. 12, 1999, 4 pp.
Written Opinion for Application No. PCT/US98/17274 dated Feb. 23, 2000, 7pp.
International Preliminary Examination Report for PCT/US98/17274 dated Jun. 22, 2000, 8 pp.
International Search Report for PCT/US01/09045 dated Oct. 23, 2001, 8 pp.
International Preliminary Examination Report for PCT/US01/09045 dated Sep. 18, 2002, 3 pp.
Office Action for U.S. Appl. No. 11/425,211, dated Mar. 26, 2008, 5 pp.
Office Action for U.S. Appl. No. 11/425,228, dated May 12, 2008, 7 pp.
Office Action for U.S. Appl. No. 11/425,228, dated Jul. 25, 2007, 6 pp.
Office Action for U.S. Appl. No. 11/425,232, dated Mar. 18, 2008, 6 pp.
Office Action for U.S. Appl. No. 09/107,971, dated Oct. 21, 2003, 25 pp.
Office Action for U.S. Appl. No. 09/107,971, dated Oct. 3, 2001, 25 pp.
Office Action for U.S. Appl. No. 11/456,276, dated Dec. 31, 2007, 10 pp.
Office Action for U.S. Appl. No. 10/457,101, dated Dec. 31, 2007, 10 pp.
Notice of Allowance for U.S. Appl. No. 10/457,101, dated Nov. 7, 2007, 4 pp.
Office Action for U.S. Appl. No. 10/457,101 dated May 25, 2007, 13 pp.
Office Action for U.S. Appl. No. 10/457,101 dated Oct. 20, 2006, 12 pp.
Notice of Allowance for U.S. Appl. No. 11/058,653 datd Jun. 4, 2008, 7 pp.
Office Action for U.S. Appl. No. 11/058,653 dated May 15, 2007, 5 pp.
Wyatt, Craig, "Usage Models Just for Merchants", Credit Card Management, vol. 8, No. 6, pp. 32-38, Sep. 1995, 4 pp.
Notice of Allowance for U.S. Appl. No. 11/425,228 mailed Oct. 8, 2008, 6 pp.
Office Action for U.S. Appl. No. 11/856,473 mailed Sep. 12, 2008, mailed Sep. 12, 2008, 5 pp.
Office Action for U.S. Appl. No. 11/934,958 mailed Sep. 24, 2008, 6 pp.
Office Action for U.S. Appl. No. 11/160,499 mailed Dec. 5, 2008, 9 pp.
Office Action for U.S. Appl. No. 11/099,287 mailed Oct. 28, 2008, 18 pp.
Office Action for U.S. Appl. No. 10/678,056 mailed Oct. 28, 2008, 4 pp.
Office Action for U.S. Appl. No. 09/107,971 mailed Oct. 28, 2008, 10 pp.
Notice of Allowance for U.S. Appl. No. 09/603,677 mailed Oct. 3, 2008, 5 pp.
Office Action for U.S. Appl. No. 09/993,588 mailed Oct. 17, 2008, 7 pp.

* cited by examiner

| UPSELL CODE(S) 104 | UPSELL PRICE 92 | ITEMS PURCHASED 96 | CUSTOMER ID REQUIRED? 98 | CUSTOMER PREFERENCES 100 | TIME PURCHASED 102 | COST 103 | UPSELL DESCRIPTOR 94 |
|---|---|---|---|---|---|---|---|
| A | BETWEEN $.02 AND $.45 | SMALL SODA | NO | NA | NA | $0.02 | SMALL SODA TO LARGE SODA |
| B | BETWEEN $.50 AND $.80 | 8 | YES | NA | NA | $0.50 | X LARGE COLA UPGRADE, DELUXE TACO UPGRADE, FREE TACO COUPON |
| C | MORE THAN $.70 | NA | NO | NA | NA | $0.70 | FREE TACO COUPON |
| D | BETWEEN $.30 AND $.70 | HAMBURGER | NO | NA | NA | $0.25 | PROMOTIONAL CUP |
| E | BETWEEN $1.50 AND $3.50 | NA | YES | NA | > 5:00PM | $1.00 | MOVIE TICKET |
| F | BETWEEN $.20 AND $.60 | 1, 5 | NO | NA | NA | $0.20 | X LARGE COLA UPGRADE, DELUXE TACO UPGRADE |
| G | LESS THAN $.20 | 2 | NO | NA | NA | $0.00 | LARGE COLA UPGRADE |
| H | BETWEEN $.05 AND $.20 | 5 | NO | NA | NA | $0.05 | DELUXE TACO UPGRADE |
| I | LESS THAN $.50 | 3 | YES | 5, 7, 3 | NA | $0.01 | X LARGE COLA UPGRADE, FREE TACO COUPON |

| CUSTOMER ID 112 | CUSTOMER NAME 114 | ADDRESS 116 | PHONE 118 | HISTORICAL PREFERENCES 120 |
|---|---|---|---|---|
| 123456 | BILL SMITH | 1425 HARD RD. NORWALK, CT 06850 | (111) 111-1111 | BB |
| 123457 | JACK GREEN | 213 PINK ST. NORWALK, CT 06850 | (111) 222-2222 | NA |
| 123458 | ELIOT BROWN | 21 CIRCLE DR. NORWALK, CT 06850 | (111) 333-3333 | 5, 7, 3, I |

| IDENTIFIER 136 | PRODUCT 132 | PRICE 134 | NUMBER IN STOCK 138 | EXPIRATION 140 |
|---|---|---|---|---|
| 1 | HAMBURGER | $1.07 | 17 | 4:00 PM |
| 2 | SMALL SODA | $0.55 | NA | NA |
| 3 | LARGE SODA | $0.90 | NA | NA |
| 4 | X LARGE SODA | $1.39 | NA | NA |
| 5 | HARD TACO | $.69 | 20 | 2:00 PM |
| 7 | SOFT TACO | $.69 | 50 | 2:00 PM |
| 8 | #8 COMBO: HARD TACO, CHICKEN FAJITA, MEDIUM COLA | $3.49 | 14 | 14 |
| 9 | CINNAMON TREAT | $0.59 | 3 | 2:00 PM |
| 10 | DELUXE TACO | $0.89 | 0 | 3:00 PM |

FIG. 6

| DATE OFFERED 158 | UPSELL(S) OFFERED 152 | ROUND-UP AMOUNT 154 | UPSELL ACCEPTED 156 | EXPIRATION 162 | DATE REDEEMED 164 | CUSTOMER ID 160 |
|---|---|---|---|---|---|---|
| 8/12/97 | G,H | $.18 | G | NA | NA | NA |
| 8/12/97 | B | $.72 | NONE | NA | NA | NA |
| 8/12/97 | C,D | $.62 | C | 14 DAYS | 8/22/97 | 123456 |
| 8/12/97 | E | $2.72 | E | NA | NA | 123560 |
| 8/12/97 | I | $.43 | I | 14 DAYS | EXPIRED | 123458 |

| CUSTOMER ID 262 | CUSTOMER NAME 264 | ADDRESS 266 | PHONE 268 | HISTORICAL PREFERENCES 270 | LINKED CUSTOMERS 272 | UPSELL DUE 274 | UPSELL EXPIRATION 275 |
|---|---|---|---|---|---|---|---|
| 123456 | BILL SMITH | 1425 HARD RD. NORWALK, CT 06850 | (111) 111-1111 | BB | 123459 | - | - |
| 123457 | JACK GREEN | 213 PINK ST. NORWALK, CT 06850 | (111) 222-2222 | NA | - | CC | 1/1/97 |
| 123458 | ELIOT BROWN | 21 CIRCLE DR. NORWALK, CT 06850 | (111) 333-3333 | 5,7,3,1 | 199998, 199999 | - | - |
| 123459 | JILL SMITH | 4210 BIG LOOP NORWALK, CT 06850 | (111) 444-4444 | - | - | A | 8/3/97 |

FIG. 11

METHOD AND SYSTEM FOR PROCESSING SUPPLEMENTARY PRODUCT SALES AT A POINT-OF-SALE TERMINAL

CROSS-REFERENCE TO RELATED APPLICATIONS

The present Application is a continuation application of commonly-owned, U.S. patent application Ser. No. 09/442,754, filed Nov. 12, 1999 and entitled "METHOD AND SYSTEM FOR PROCESSING SUPPLEMENTARY PRODUCT SALES AT A POINT-OF-SALE TERMINAL", which issued as U.S. Pat. No. 6,598,024 on Jul. 22, 2003; which is a continuation application of commonly-owned U.S. patent application Ser. No. 08/920,116, filed Aug. 26, 1997 and which issued as U.S. Pat. No. 6,119,099 on Sep. 12, 2000; which is a continuation-in-part application of commonly-owned U.S. patent application Ser. No. 08/822,709, filed Mar. 21, 1997 and which issued as U.S. Pat. No. 6,267,670 B1 on Jul. 31, 2001, all of which are incorporated herein by reference.

FIELD OF THE INVENTION

The present invention relates to point-of-sale terminals, and, more specifically, to methods and systems for processing product sales at point-of-sale terminals.

BACKGROUND OF THE INVENTION

Most stores that are visited by customers have one or more point-of-sale ("POS") terminals, such as cash registers. Store cashiers use POS terminals for calculating the total price of a purchase (one or more products) and the amount of change due to a customer. Some POS terminals furthermore track purchases made and adjust a database of store inventory accordingly.

The amount of change due is the difference between the purchase price and the amount tendered by the customer. Customers typically tender whole number cash amounts in the form of bills of paper money, while purchase prices are most often non-whole number amounts. Accordingly, the amount of change due to a customer at a POS terminal typically includes one or more coins, which the POS terminal or cashier dispenses to the customer.

Receiving and carrying change, especially coins, is an annoyance to many customers. Consequently, customers often are forced to tender non-whole number cash amounts in order to dispose of their unwanted coins and/or reduce the coins that would otherwise be given to them as change for their purchase. Coins and bills that are tendered by the customer are collected by the cashier at the POS terminal.

Both dispensing coins to and collecting coins from a customer increases the amount of time a cashier spends processing a purchase, and therefore increases the amount of time that customers wait in line at a POS terminal. Accordingly, businesses must pay wages for time spent handling coins, and customers must experience delays as coins are exchanged between cashiers and customers.

In addition, it is possible that the cashier will make a mathematical error and dispense the wrong amount of change. Customers often anticipate such an error and count their change to assure that they received the correct amount. Such customers typically count their change before leaving the POS terminal, further delaying other customers.

Businesses incur costs associated with counting, rolling, banking and otherwise handling coins. By some estimates, businesses expend hundreds of thousands of hours and hundreds of millions of dollars each year just to handle coins.

In summary, the exchange of change, especially coins, between customers and POS terminals is costly, time-consuming and undesirable. Unfortunately, conventional POS terminals merely calculate purchase prices and amounts of change due, and cannot reduce the amount of change due nor the exchange of coins.

Accordingly, it would be advantageous to provide a system and method that reduced the amount of change due, and therefore reduced the coins exchanged between customers and cashiers at a POS terminal.

SUMMARY OF THE INVENTION

It is an object of the present invention to provide methods and systems for offering selected products in exchange for the amount of change due at POS terminals.

Generally, according to one aspect of the present invention, a POS terminal determines an upsell to exchange for the change due to a customer in connection with his purchase. The point-of-sale terminal preferably maintains a database of at least one upsell price and a corresponding upsell to offer a customer in exchange for the change due to him. The upsells and upsell prices are established so that upsells are profitably exchanged for the change due, thus providing the business with profit and the customer with value if the upsell is accepted.

When a customer brings a purchase to a POS terminal, the POS terminal generates the purchase price and sets a "required payment amount" to be equal to the purchase price. The required payment amount indicates the amount the customer is expected to pay. The POS terminal then generates a rounded price, preferably by rounding up the purchase price to a whole number, and calculates therefrom a round-up amount equal to the difference between the purchase price and the rounded price. Accordingly, the round-up amount indicates the coins due as change.

By comparing the calculated round-up amount with at least one of the upsell prices in the database, the POS terminal may determine whether the round-up amount corresponds to any of the upsell prices. If so, the POS terminal identifies the upsell corresponding to this upsell price, and outputs signals indicative of the identified upsell. The output signals are preferably displayed text or graphics that explain to the customer and/or the cashier that the upsell may be purchased for the specified amount of change due.

If the customer accepts the upsell, the cashier so indicates by pressing a selection button on the POS terminal. The required payment amount for the customer to pay is then set equal to the rounded price, rather than the purchase price. Thus, the customer receives the upsell in exchange for the coins due to him, and the coins need not be exchanged between the customer and the POS terminal.

BRIEF DESCRIPTION OF THE DRAWINGS

FIG. 1b is a schematic illustration of another embodiment of the POS terminal of FIG. 1a.

FIG. 3 is an exemplary illustration of a storage area of the POS terminal of FIG. 1a.

FIG. 4 is a schematic illustration of an upsell database of the POS terminal of FIG. 1a.

FIG. 5 is a schematic illustration of a customer database of the POS terminal of FIG. 1a.

FIG. 6 is a schematic illustration of an inventory price database of the POS terminal of FIG. 1a.

FIG. 7 is a schematic illustration of an offered price database of the POS terminal of FIG. 1a.

FIG. 9 is a schematic illustration of an identifier database of the POS terminal of FIG. 1a.

FIG. 11 is a schematic illustration of another embodiment of the customer database of the POS terminal of FIG. 1a.

DETAILED DESCRIPTION OF THE PREFERRED EMBODIMENTS

As used herein, an "upsell" is a product (good or service) which is offered along with a purchase and has a value approximately equal to a predetermined upsell price. Types of upsells which are described in detail herein include (i) an upgrade from a first product to a second product different from the first product, (ii) an additional product, (iii) a voucher which is redeemable for a product or a discount thereon, and (iv) an entry in a sweepstakes, contest, lottery or other game. Various other types of upsells may be used without departing from the scope and spirit of the present invention.

By offering an upsell in exchange for the customer's change, an average of approximately fifty cents additional revenue is collected per upsell, and the number of coins exchanged is reduced or eliminated. The reduction or elimination of change dispensing and collecting greatly reduces the time a customer spends at a POS terminal. In some cases, it may even be possible to reduce the number of cashiers, if any, who operate POS terminals. In addition, customers may recognize a greater value from the transaction while reducing or eliminating the need to carry additional change after a purchase.

Further, the present invention allows businesses to more effectively sell aged or perishable products by offering such products in exchange for change due. Such products, such as aging magazines, audio tapes, compact discs, flowers and various perishables can be sold, thereby generating additional revenue and reducing the costs of otherwise disposing of the products. Providing the customer with aged products effectively allows businesses to "pre-qualify" customers to receive discounts on products.

Figure 1A:
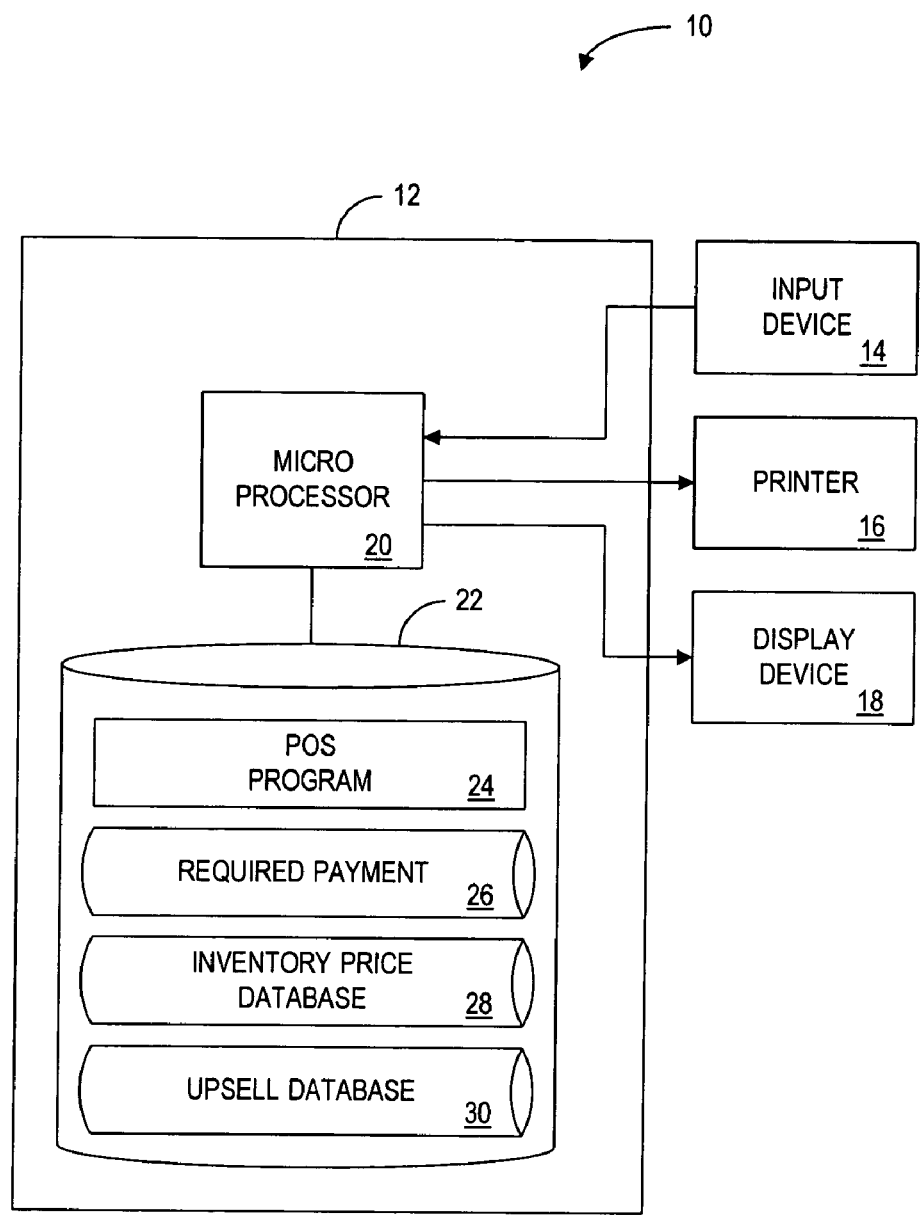
FIG. 1a is a schematic illustration of a POS terminal provided in accordance with the present invention.

Referring to FIG. 1a, a POS terminal 10 includes a POS processor 12 connected to each of an input device 14, a printer 16 and a display device 18. The POS processor 12 comprises at least one microprocessor 20, such as an Intel 80386 microprocessor, which is connected to a storage device 22, such as a RAM, floppy disk, hard disk or combination thereof.

The microprocessor 20 and the storage device 22 may each be (i) located entirely within a cash register, vending machine or similar enclosure; (ii) connected thereto by a remote communication link, such as a serial port cable, telephone line or radio frequency transceiver; or (iii) a combination thereof. For example, the POS processor 12 may comprise one or more cash registers connected to a remote server computer for maintaining databases, or a vending machine connected to a local computer. Many types of conventional cash registers and other types of POS terminals may be used to implement the present invention in light of the present disclosure. Such terminals may only require software upgrades, which are typically performed without undue effort.

Figure 1B:
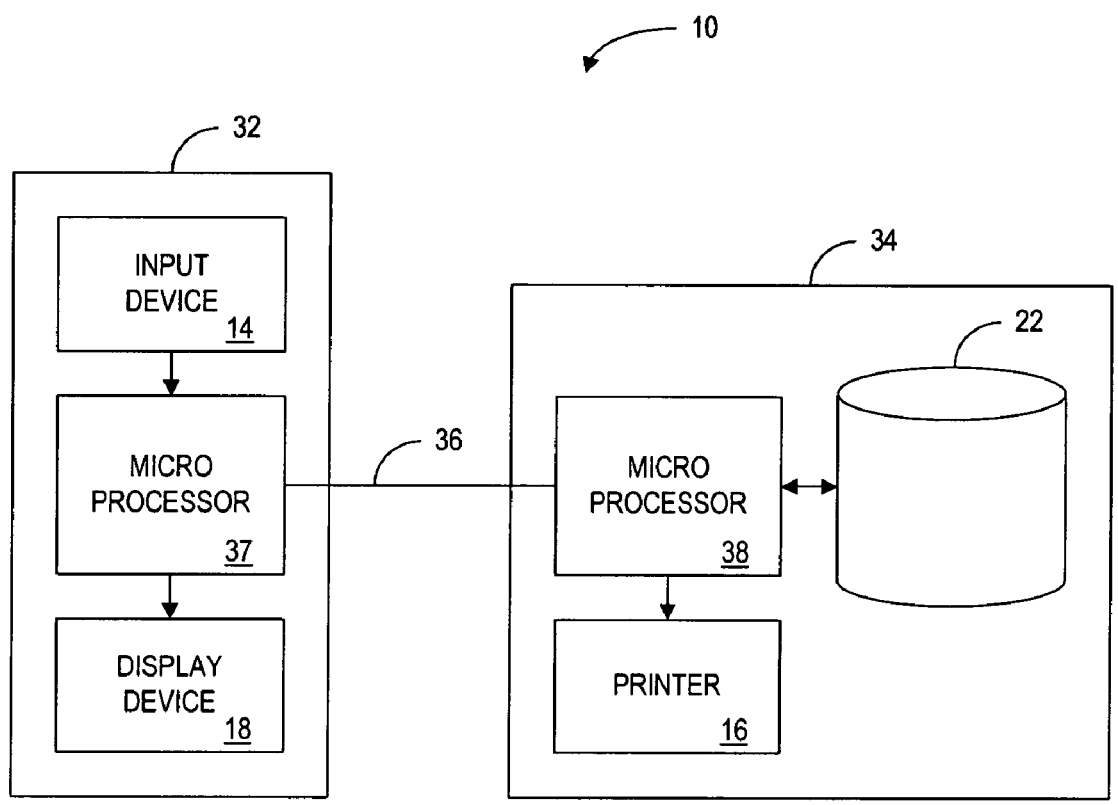

FIG. 1b illustrates another embodiment of the POS terminal 10 in which a first device 32 communicates with a second device 34 via a remote communication link 36. The first device 32, which may be a cash register, comprises the input device 14, the display device 18 and a microprocessor 37 which performs some of the functions of the microprocessor 20 of FIG. 1a. The second device 34 may be, for example, a processing system operated by an electronic marketing service or credit card clearinghouse. The second device 34 comprises the storage device 22, the printer 16 and a microprocessor 38 which performs some of the functions of the microprocessor 20 of FIG. 1a.

Referring again to FIG. 1a, the input device 14 is preferably a keypad for transmitting input signals, such as signals indicative of a purchase, to the microprocessor 20. The printer 16 is for registering indicia on a portion of a roll of paper or other material, thereby printing receipts, coupons and vouchers as commanded by the microprocessor 20. The display device 18 is preferably a video monitor for displaying at least alphanumeric characters to the customer and/or cashier. Many types of input devices, printers and display devices are known to those skilled in the art, and thus need not be described in detail herein.

The storage device 22 stores a POS program 24 for controlling the microprocessor 20 in accordance with the present invention, and particularly in accordance with the processes described in detail hereinafter. The POS program 24 also includes necessary program elements, such as "device drivers" for interfacing with each of the input device 14, printer 16 and display device 18. Appropriate device drivers and other necessary program elements are known to those skilled in the art, and need not be described in detail herein.

The storage device 22 also stores a required payment amount 26, which is an amount of money expected to be paid in return for products provided to the customer. From the required payment amount 26, the microprocessor 20 may determine, for example, the change due and the total amount of money that should have been collected by the POS terminal 10 at the end of a day. Those skilled in the art will note that the required payment amount may comprise a single stored value or a plurality of values which each correspond to an amount of money expected to be paid for one or more products.

The storage device 22 furthermore stores an inventory price database 28, which includes products and corresponding product prices. The inventory price database 28 enables the microprocessor 20 to calculate a total purchase price of one or more products, and in turn store the total purchase price in the required payment amount 26.

An upsell database 30 stored in the storage device 22 includes upsells and corresponding upsell prices. An upsell price as used herein is a price, set of prices or range of prices at which it is desirable to sell the corresponding upsell. The upsell price is typically related to the cost of the upsell to the business. For example, if the cost to a restaurant is 20¢ for a small soda, then the upsell price of one additional small soda is a range greater than 20¢, such as the range from 20¢ to 30¢. As another example, if the cost to the restaurant is 22¢ for a large soda, then the cost of an upsell from a small soda to a large soda for the restaurant is the incremental cost 22¢−20¢=2¢. Accordingly, the upsell price may possibly be a range having a lower bound of 2¢.

In addition, it is desirable that the upsell price has an upper bound that is less than a predetermined amount. For example, an upsell price should not exceed the price of a product offered as an upsell. Using the example given above, the upsell price for an upgrade from a small soda to a large soda is a range with a lower bound of 2¢. An upper bound for this upsell price should not exceed the cost of a large soda, for example, 90¢. Otherwise, the customer would pay more than the price he would have paid if he had included a large soda in his purchase. Proposing such a transaction to the customer, for example, 95¢ in exchange for a 90¢ large soda, is likely to be ineffective, as well as insulting to the customer.

In general, the price of a product to a customer is different from the cost of the product to the business that offers the product. Therefore, the upsell prices in the upsell database 30 cannot be ascertained from only the product prices in the inventory price database 28, but must be calculated so as to yield a profit. For example, the inventory price database 28 may indicate that the price of a small soda is 55¢ and the price of a large soda is 90¢. From these two prices alone, it is impossible to determine that the cost to a restaurant is 20¢ for a small soda and 22¢ for a large soda, and thus that the cost of such an upsell from small to large soda is 2¢. Accordingly, it is impossible to determine, from the inventory price database 28 alone, that it would be profitable for the restaurant to profitably provide the upsell for relatively small upsell prices, such as 5¢ or 10¢. Such a profit point can only be determined as a function of the costs.

The above-described difference between the prices of products to customers and the costs of the products to the business permits the POS terminal to determine upsells which (i) are profitably sold for the change due to a customer, and also (ii) provide the customer with a product at a reduced price, in exchange for his change. Providing the product at a reduced price tends to increase customer satisfaction, generate additional revenue for the business and increase inventory turnover. At the same time, the prices of products need not be reduced, and thus the profits from sales of these products (besides upsells) remain substantially or completely unaffected by offering upsells.

One type of upsell, which several kinds of businesses may offer, is an upgrade from a first product to a second product. Accordingly, a combination of (i) a purchase including a first product, and (ii) an upsell including an upgrade from a first product to a second product would effectively result in the upgrade from the first product to the second product. A restaurant, for example, may offer an upsell comprising an upgrade from a small soda to a large soda, or an upgrade from a plain taco to a deluxe taco. An electronics store may offer an upsell that extends the effective term of a warranty.

Another type of upsell is an additional product to supplement the customer's purchase. For example, a restaurant may offer an upsell comprising a promotional cup or a dessert; a video store may offer an upsell comprising a movie rental ticket, additional videotape or promotional hat; a vending machine may offer an upsell that provides an extra candy bar; an appliance store may offer an upsell comprising a warranty; and a supermarket may offer an upsell comprising any one item from a bin of perishable goods. Such a supermarket upsell is particularly advantageous in generating revenue and liquidating perishable products.

Figure 2:
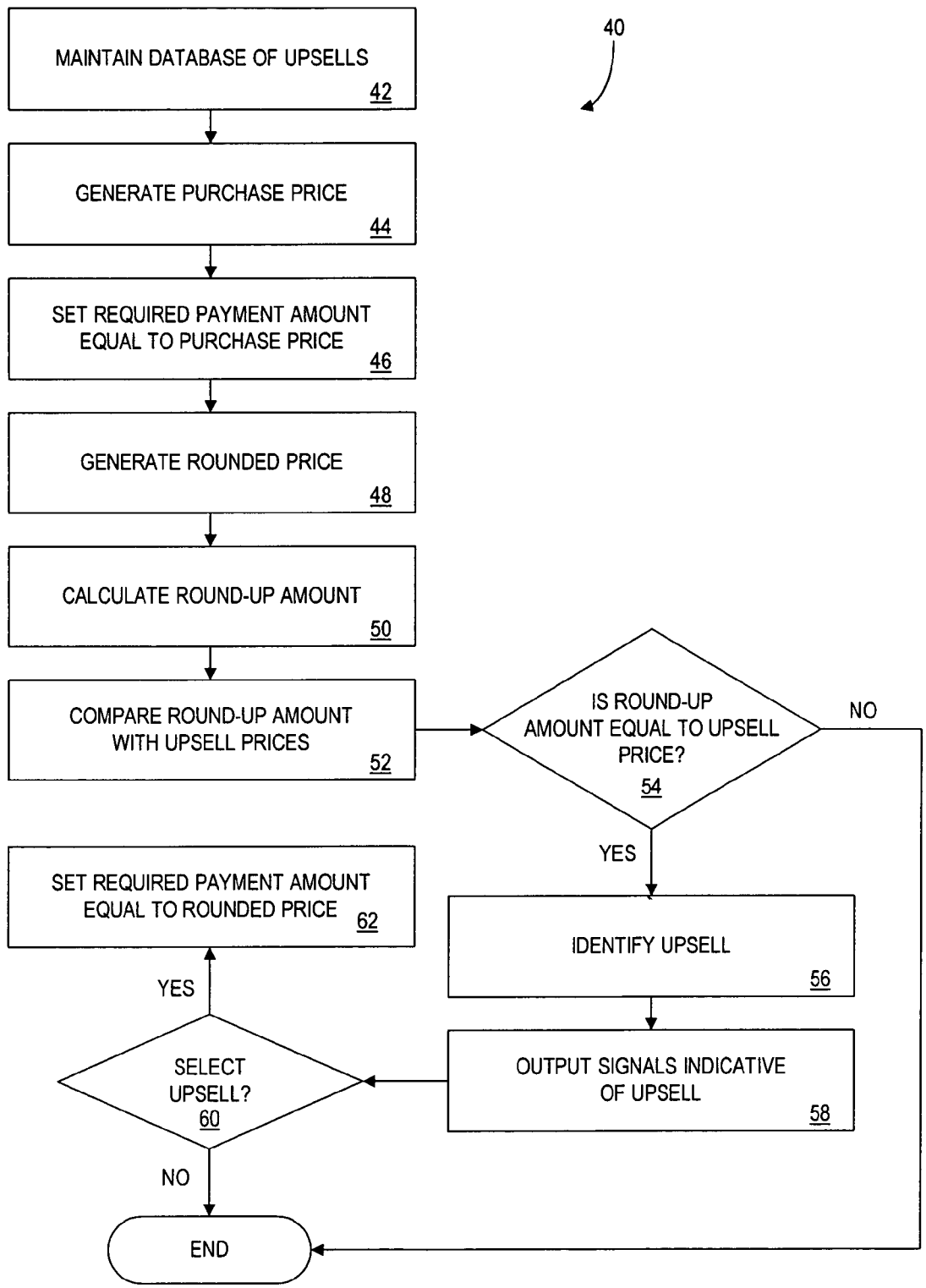
FIG. 2 is a flow chart illustrating a method of the present invention for determining an upsell at a POS terminal.

FIG. 2 illustrates a method 40 for determining an upsell of a purchase at a POS terminal. The POS terminal of this embodiment, for example the POS terminal 10, maintains a database of upsell prices and corresponding upsells (step 42). The POS terminal furthermore generates a purchase price of a purchase (step 44), and sets the required payment amount 26 (FIG. 1*a*) to be equal to the purchase price (step 46). The step of generating a purchase price may comprise, for example, (i) pressing keys on the input device 14 (FIG. 1*a*) which each correspond to a product, (ii) pressing numeric keys on the input device 14 which correspond to the digits of the purchase price, or (iii) receiving digital signals indicative of a currency value from a remote computing device.

The POS terminal then generates a "rounded" price (step 48), and calculates a round-up amount (step 50) equal to the difference between the purchase price and the rounded price. The rounded price may be calculated as, for example, the smallest whole number dollar amount that is greater than the purchase price, the smallest multiple of five dollar amount that is greater than the purchase price, or the amount of money tendered by the customer, which may or may not be a whole number amount. When the rounded price is a whole number, the customer can easily tender bills and in turn receive, at his discretion, either (i) no change, or (ii) change which consists solely of bills, not coins. When the rounded price is a multiple of large coins, such as nickels, dimes, quarters or half dollars, the customer can receive change that consists solely of coins the customer desires, such as quarters. Many other forms of rounded prices may be calculated in accordance with the present invention.

The POS terminal then determines at least one upsell to be exchanged for the round-up amount (change due). Preferably, to identify the upsell, the POS terminal compares the round-up amount with at least one of the upsell prices in the upsell database (step 52) to identify at least one upsell having an upsell price including the round-up amount. If the round-up amount corresponds to an upsell price (step 54), the POS terminal identifies an upsell (step 56) which corresponds to that upsell price, thereby identifying the upsell to exchange. The POS terminal then outputs signals indicative of the identified upsell (step 58), such as displaying text and/or graphics that explain to the customer and/or the cashier that the identified upsell may be purchased for the round-up amount.

The customer indicates to the cashier whether he accepts or rejects the offered upsell. The cashier then presses a button on the POS terminal or otherwise generates a selection signal for indicating selection between the identified upsell and change (step 60). If the selection signal indicates selection of the upsell, the required payment amount is set to be equal to the rounded price (step 62). Thus, the customer tenders cash, a check or a credit card to satisfy the amount of money expected to be paid, and receives the upsell in exchange for the round-up amount.

As discussed above, those skilled in the art will realize that the required payment amount may comprise a single stored value or a plurality of values which each correspond to an amount of money expected to be paid for one or more products. For example, the step 62 of setting the required payment amount to be equal to the rounded price may comprise (i) setting a stored unitary value to be equal to the rounded price; or (ii) setting a first stored value to be equal to the purchase price and setting a second stored value to be equal to the round-up amount, similar to the case where two purchases are recorded.

Figure 3:
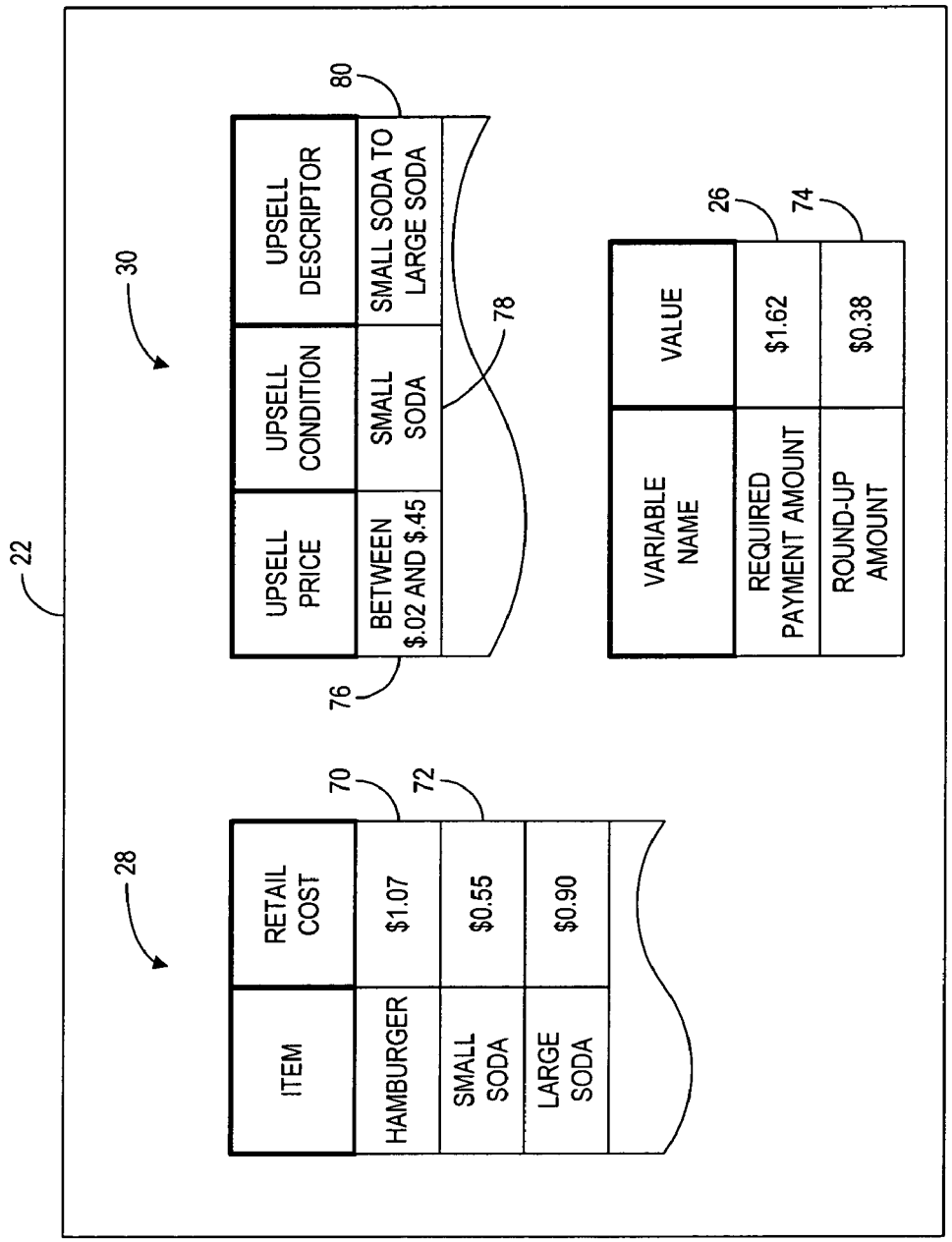

In the example illustrated in FIG. 3, a customer at a fast-food restaurant orders a purchase that includes a hamburger and a small soda. A cashier records the purchase at a POS terminal, and the POS terminal in turn determines the product prices of each of the hamburger and the small soda from entries 70 and 72 in the inventory price database 28. The POS terminal generates therefrom the purchase price $1.62, and sets the required payment amount 26 to be $1.62.

The POS terminal then generates a "rounded" price of $2.00 (using, in this example, "2" as the smallest whole number which is greater than the purchase price), and calculates a round-up amount 74 of $2.00−1.62=38¢. Since the rounded price is a whole number, the customer may easily tender bills and receive either no change or change which consists solely of bills, not coins.

The POS terminal compares the round-up amount 74 with at least one of the upsell prices in the upsell database 30. The round-up amount 74 corresponds to a compared upsell price 76 (the range from 2¢ to 45¢), and the product sold (small soda) corresponds to the upsell condition 78, so the POS terminal identifies an upsell 80 in the upsell database 30 which corresponds to the upsell price 76. The POS terminal then displays text or graphics that explain to the customer and/or the cashier that the upsell 80 may be purchased for the specified amount of change due (the round-up amount 74).

The customer indicates to the cashier whether he accepts or rejects the offered upsell. The cashier then presses a button on the POS terminal or otherwise generates a selection signal for indicating selection between the identified upsell 80 and change. If the selection signal does not indicate selection of change, but instead selection of the upsell 80, the required payment amount 26 is set to be equal to the rounded price. Thus, the customer receives the upsell (an upgrade from a small soda to a large soda), and there are no coins due.

In some embodiments of the present invention, the POS terminal determines the upsell(s) by identifying at least one upsell in the database that corresponds to the compared upsell price. For example, an upsell comprising a small soda may correspond to an upsell price range of between 2¢ and 20¢. In other embodiments, the POS terminal determines the upsell(s) by identifying at least one upsell in the database which corresponds to both (i) the compared upsell price, and (ii) at least one "purchase condition".

A purchase condition is a condition in effect when the purchase is processed at the POS terminal. Some types of purchase conditions are the purchase price, time of day, day of the week, season, the identity of a product included in the purchase, the cost of a product included in the purchase, and/or past purchases made by the customer. Other types of purchase conditions may be employed without departing from the spirit and scope of the present invention.

The use of purchase conditions in the present invention allows upsells to be more accurately determined, and in turn increases the likelihood that an upsell will appeal to a customer and be exchanged for change due. For example, at certain times during a day, a customer may have a stronger desire for certain upsells. A meal is a more appealing upsell during dinnertime than during the mid-afternoon, and a video rental is more appealing in the evening than in the morning. Accordingly, consideration of the time of a purchase may allow more appealing upsells to be offered.

In embodiments that employ purchase conditions, upsell prices in the upsell database have a corresponding upsell and at least one corresponding upsell condition to compare with the purchase condition. Furthermore, the POS terminal generates the purchase condition(s) in any of a number of ways. For example, a clock signal can provide the time and/or date, the purchase recorded by the POS terminal can provide the identity of products, and a "frequent shopper card" can provide signals indicative of the customer's identity and past purchases made by the customer.

Referring to FIG. 4, an upsell database 90, which is one embodiment of the upsell database 30 of FIG. 1a, includes upsell prices 92, upsell descriptors 94 and a plurality of upsell conditions, including the items purchased 96, whether a customer identifier is required 98, customer product preferences 100, the time of day 102 and cost 103 to the business. The entries in the upsell database 90 may be uniquely identified by upsell codes 104.

Several types of purchase conditions, which are compared with upsell conditions, may be stored in one or more databases in the storage device 22 (FIG. 1a). For example, FIG. 5 illustrates a customer database 110, which includes unique customer identifiers 112, as well as customer-specific information, such as name 114, address 116, telephone number 118 and historical product preferences 120. The POS terminal 10 (FIG. 1a) may employ the customer database 110 to determine various purchase conditions, and offer upsells accordingly as described above. A customer at a POS terminal may provide a corresponding customer identifier, and thereby provide his customer-specific information, in any of a number of ways. For example, the customer may type his customer identifier into the POS terminal, or may "swipe" (pass) a frequent-shopper card containing a unique identification code through a card reader at the POS terminal.

Other types of purchase conditions may be derived from an inventory price database. Referring to FIG. 6, an inventory price database 130, which is one embodiment of the inventory price database 28 of FIG. 1a, includes products 132 and corresponding product prices 134. The inventory price database 130 may also include unique product identifiers 136, as well as the numbers of such products in stock 138. It may also be desirable to store the "age" (expiration date or time) 140 of certain types of products, thus allowing older products to be identified and offered as upsells.

For each purchase, the above-described purchase conditions, the round-up amount and whether the upsell was selected may be stored in a database of offered upsells. Such a database of offered upsells could provide information on which upsells were accepted by customers, and under what circumstances the upsells were accepted. Thus, from this database, the value of upsells to consumers may be determined, and the upsell database can be adjusted accordingly. For example, if consumers rarely accept a certain upsell, the upsell may be eliminated from the database or may be offered in exchange for much smaller amounts of change.

FIG. 7 illustrates an embodiment of an offered upsell database 150 stored in the storage device 22 (FIG. 1a). The offered upsell database 150 includes upsells which were offered 152, the corresponding round-up amount 154 and which upsell, if any, was accepted 156. Other purchase conditions may be desirable to store in the offered upsell database 150, such as the date 158 of the offered upsell, a unique customer identifier 160, an expiration period 162 for redeeming the upsell, if any, and the date 164 the upsell was accepted (redeemed), if any.

In the embodiments discussed above, the POS terminal identified a single upsell to offer in exchange for a round-up amount. However, the POS terminal 10 (FIG. 1a) may identify more than one upsell that corresponds to an upsell price. In such an embodiment, the POS terminal 10 can provide the customer with a selection of possible upsells. The POS terminal 10 may display all of these upsells simultaneously, or may display the upsells sequentially.

In embodiments where the upsells are displayed simultaneously, the customer selects from among the displayed upsells. In embodiments where the upsells are displayed sequentially, the customer may reject (fail to select) the first displayed upsell, and the POS terminal 10 then displays a second upsell. Sequentially-displayed upsells can be sorted according to a sorting criteria, allowing the sequence of displayed upsells to proceed in a desired manner. Thus, a first upsell that is sorted before a second upsell is displayed first. If the first upsell is not selected, the second upsell is then displayed.

The upsells may be sorted according to the profit earned on each upsell. In such an embodiment, the upsell yielding the highest profit to the business is offered first. If the customer rejects the highest profit upsell, other upsells having lower profits may be subsequently-displayed. Thus, even if a customer rejects a first upsell, he may select a subsequent upsell that still provides profit to the seller.

In certain other embodiments of the present invention, the POS terminal provides a second upsell having a higher-value to the customer if a first upsell has been rejected. Such a higher-value upsell may be more likely to be accepted than the first upsell. Such a sequence of increasingly-valuable offers may result in the customer's consistent rejection of the first upsell offer. Accordingly, in another embodiment, the POS terminal generates a random number using any of a number of known methods. The random number may be used to determine (i) whether subsequent upsells are offered at all, or (ii) the relative order in which the upsells of different value will be offered. Thus, customers are unsure of whether a second upsell will be offered and/or what the value of a second upsell may be, so they will not automatically reject the first upsell.

Figure 8:
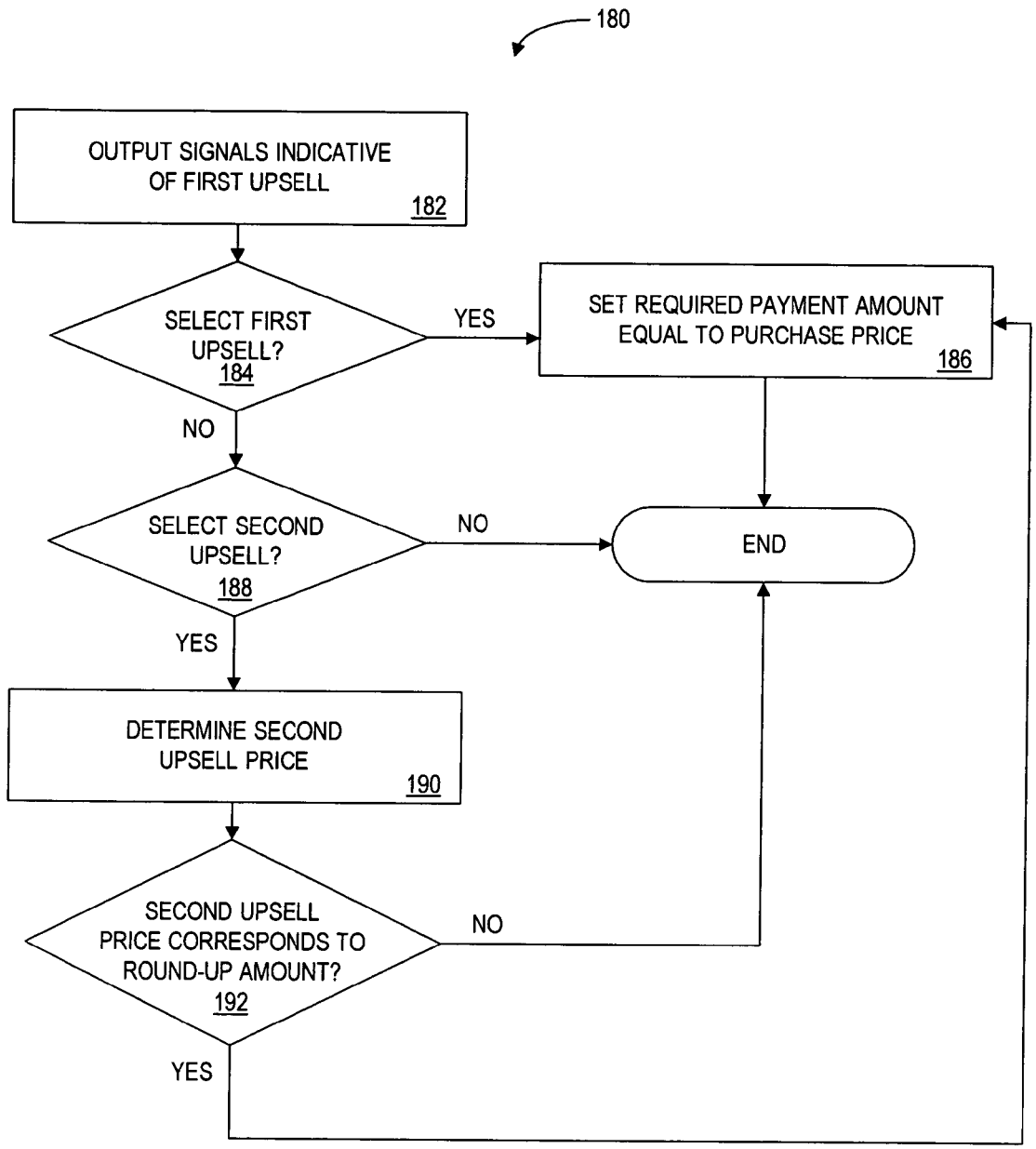
FIG. 8 is a flow chart illustrating a method of the present invention for evaluating a counter-offer for an upsell at a POS terminal.

FIG. 8 illustrates a method 180 in which the customer provides a counter-offer to exchange his change for a second upsell. The POS terminal then determines whether to accept this counter-offer.

As described above, the POS terminal outputs signals indicative of a first (identified) upsell (step 182). The POS terminal generates a selection signal for indicating selection between the first upsell, change and a second upsell (counter-offer by customer). If the selection signal indicates selection of the first upsell (step 184), then, as described above, the required payment amount is set equal to the purchase price (step 186). However, if the selection signal indicates selection of the second upsell (step 188) (i.e., the customer counter-offers for the second upsell), a second upsell price corresponding to the second upsell is determined (step 190) from the upsell database. If the calculated round-up amount corresponds to the second upsell price (step 192) (i.e., the customer's change is sufficient for the second upsell), the required payment amount is set to be equal to the rounded price (step 186), and the second upsell is thereby accepted.

Besides product upgrades and additional products, another type of upsell is a voucher that is redeemable for a product or a discount thereon. Vouchers can be especially valuable to a seller because they attract customers back to a business and possibly provide repeat sales. A customer is typically more likely to return to a business to use a purchased voucher (i.e. purchased with his change) than to use a free voucher. Vouchers provide further value to the seller through the possibility of breakage (i.e. loss and thus non-redemption of a purchased voucher).

A voucher may either be related to the round-up amount or independent thereof. For example, one type of voucher is a coupon redeemable for a discount on a future purchase, in which the discount amount is equal to the round-up amount of the present purchase. In contrast, another type of voucher is a coupon redeemable for a certain product, regardless of the round-up amount of the present purchase.

Upon accepting the upsell, either the cashier presents a pre-printed coupon to the customer, or the POS terminal prints one for the customer. Printed vouchers may be registered with many different types of indicia, such as redemption information, a unique identifier, the date of the purchase or an expiration date.

In embodiments that include printing a unique identifier on the voucher, the POS terminal maintains a database for storing a plurality of identifiers. When a new voucher must be printed, the POS terminal generates a unique identifier that does not already exist in the identifier database. This identifier is then stored in the identifier database. By searching the identifier database for a voucher identifier, redemption of the voucher may be tracked and the same voucher cannot be redeemed more times than permissible.

Figure 9:
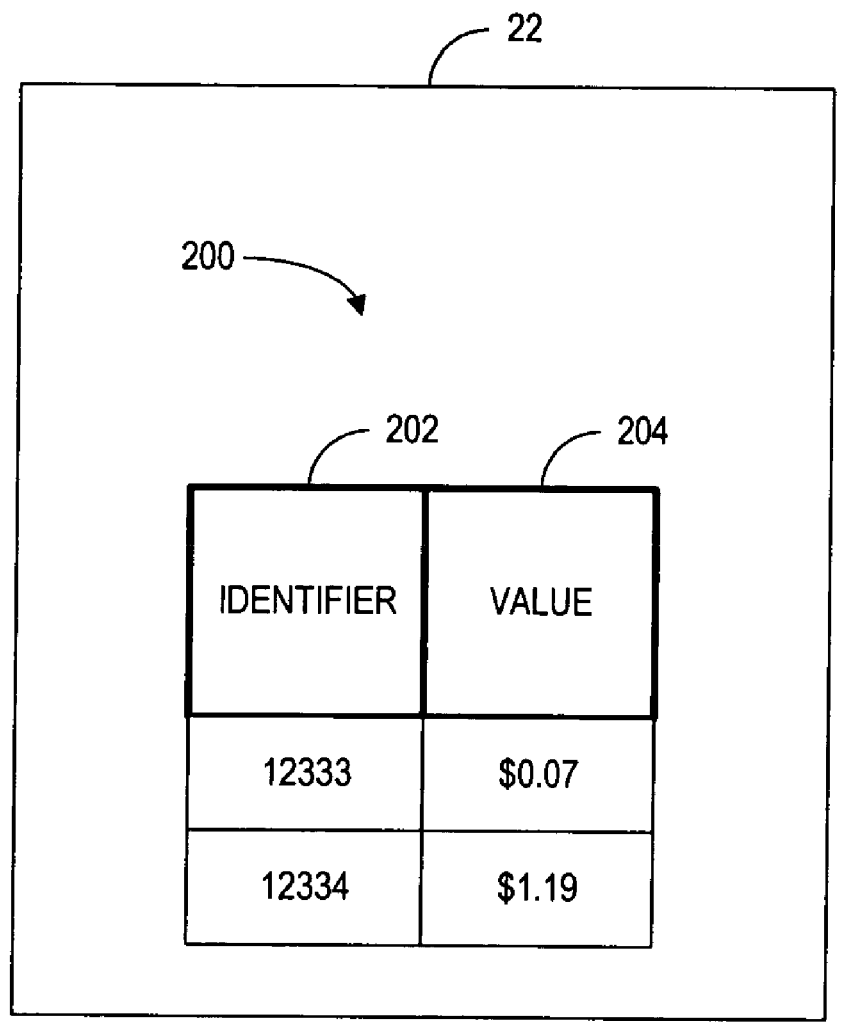

Referring to FIG. 9, the storage device 22 stores an identifier database 200, which includes unique identifiers 202 for identifying each voucher. The identifier database 200 may further include voucher face values 204, which may (or may not) equal the round-up amount exchanged for the voucher. Stored voucher face values allow each voucher to be redeemed for a different value, while minimizing fraud. For example, the voucher face values 204 stored in the database 200 may be retrieved upon redemption and compared with values printed on the vouchers. Discrepancies between stored and printed voucher values would indicate forgery of the printed voucher.

Yet another type of upsell is an entry in a game, such as a lottery, contest, sweepstakes or other game. In some embodiments, the prize for winning the game depends on the round-up amount used to purchase the game entry. For example, the prize for winning the game may be proportional to the round-up amount paid for the game entry. In such embodiments, the prize collected upon winning the game is greater for greater round-up amounts. In other embodiments, the probability of winning may be greater for greater round-up amounts. For example, a game entry for which a customer paid $1.50 may have twice as much of a chance of winning as a game entry for which another customer paid 75¢.

Upon receiving an input indicating selection of the game upsell in exchange for the round-up amount, the POS terminal generates a unique identifier to identify the game entry. The unique identifier and the round-up amount are stored in a game database of identifiers and round-up amounts. When a winning entry is determined, the game database provides the round-up amount corresponding to the entry, and thereby determines the prize value.

Figure 10:
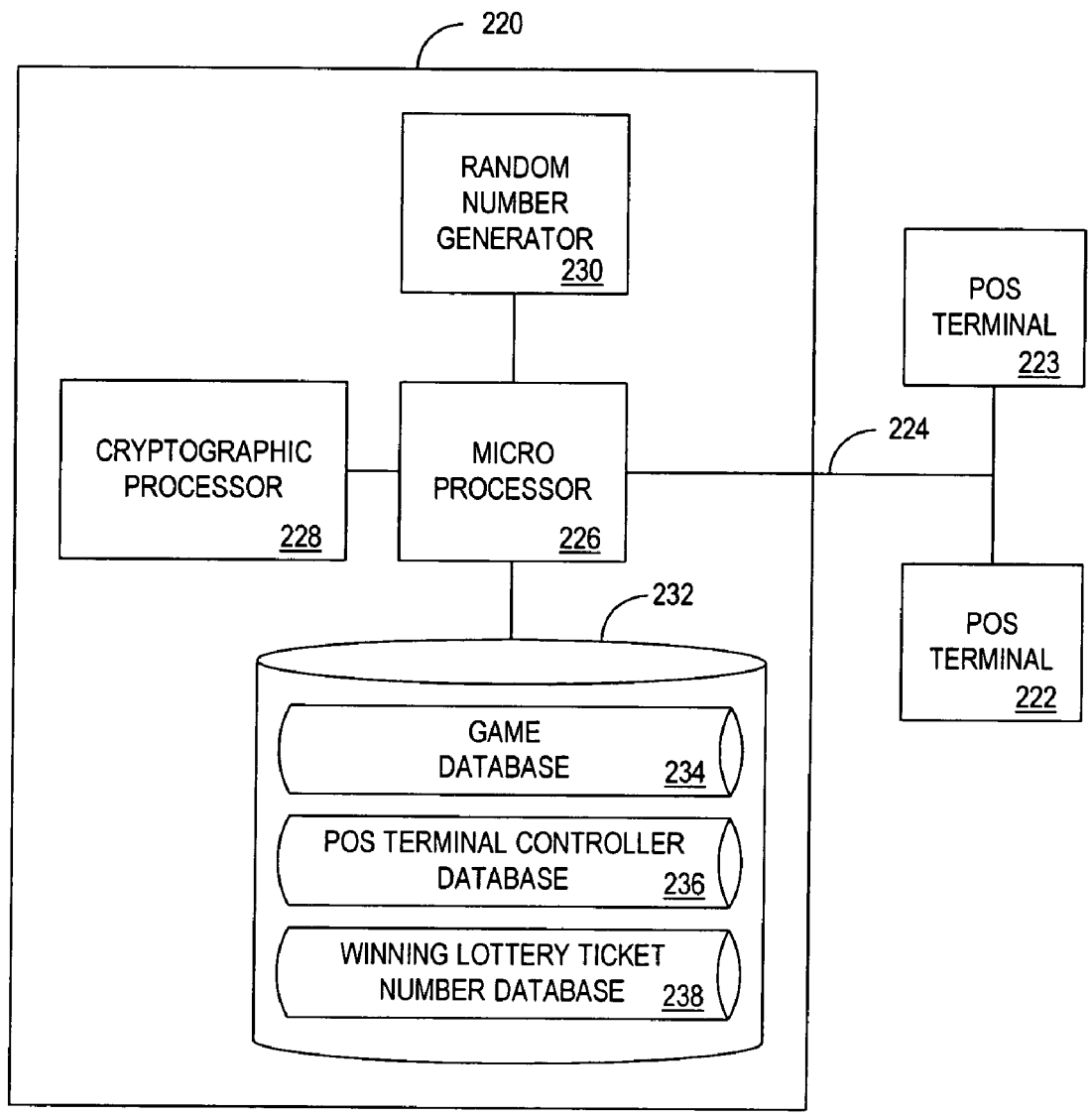
FIG. 10 is a schematic illustration of POS terminal connected to a lottery data processing system.

The game database may be, for example, a database maintained by the POS terminal and stored in the storage device 22 (FIG. 1*a*). In another embodiment illustrated by FIG. 10, the game database resides in a lottery data processing system 220 that is connected to POS terminals 222 and 223 through a communication link 224. Although two POS terminals are shown in FIG. 10 for purposes of clarity, more POS terminals may be connected to the lottery data processing system 220.

The lottery data processing system 220 is typically a controller located in a store for controlling lottery ticket transactions performed at POS terminals in the store. The system 220 thereby serves to collect and store lottery transactions (such as lottery ticket upsells) performed at the store's POS terminals. Such centralized control of lottery transactions allows customers at a number of POS terminals to each receive upsells that permit participation in a single lottery, contest or other game.

The lottery data processing system 220 comprises a microprocessor 226 for controlling other components described below. The microprocessor 226 communicates with each of a cryptographic processor 228 for authenticating lottery transactions and a random number generator 230 for generating "quick-pick" lottery numbers for each game entry. A storage device 232 also communicates with the microprocessor 226, and stores (i) the above-described game database 234 of identifiers and round-up amounts; (ii) a POS terminal controller database 236 for maintaining information on POS terminals connected to the lottery data processing system 220, such as a unique identifier for each terminal and the specific lottery transactions of each terminal; and (iii) a winning lottery ticket number database 238 for storing winning numbers, and thereby indicating winning entries.

In each of the embodiments of the present invention described above, the customer selects and receives an upsell. However, as described below, the customer may prefer to transfer ("donate") his upsell to a second customer, with the upsell being received by the second customer at his next visit to a POS terminal. The second customer may visit the POS terminal, for example, to pay for products, as described above, or specifically to collect the donated upsell.

FIG. 11 depicts a customer database 260 which is another embodiment of the customer database 110 (FIG. 5) stored in the storage device 22. The customer database 260 includes unique customer identifiers 262, as well as customer-specific information described above, such as name 264, address 266, telephone number 268 and historical product preferences 270. In addition, the customer database 260 includes linked customer identifiers 272 that identify others (if any) to which the customer's upsells are donated.

For example, using the functionality of the customer database 260, a customer may specify that an acquaintance receives the customer-earned upsell. The customer database 260 also includes upsells due 274 to the customer, such as upsells previously earned or transferred to him by another, as well as upsell expiration dates 275 indicating the last dates for receiving the upsells due.

Using the exemplary data shown in the database 260 of FIG. 11, a first customer identifier 276 of the record 277 identifies a customer name "Bill Smith" and further identifies a corresponding linked customer through identifier 278 in field 272. This linked customer identifier 278 corresponds to the customer identifier 280 identifying the customer "Jill Smith". Accordingly, Jill Smith has been identified and receives upsells donated by Bill Smith.

An upsell due 282 is associated with customer identifier 280 of record 281 (Jill Smith). The upsell due 282 is provided based on a purchase by Bill Smith, and is collected by Jill Smith during a visit to a POS terminal. The upsell identifier "A" in field 274 may comprise, for example, a small soda. Thus, the use of "linked customers" thus allows customers to transfer earned upsells, or even purchased products, thereby increasing both customer satisfaction and customer retention.

A customer may prefer to randomly donate his upsell to one (or more) of a number of customers, such as a number of family members or a predetermined list of needy families, rather than to any one customer in particular. In such an embodiment, the donating customer may first designate an associated group of linked customer identifiers 272. Alternatively, the customer may let the store select a group of customers. A random one (or more) of this group is selected by the POS terminal as the recipient of the upsell.

Figure 12A:
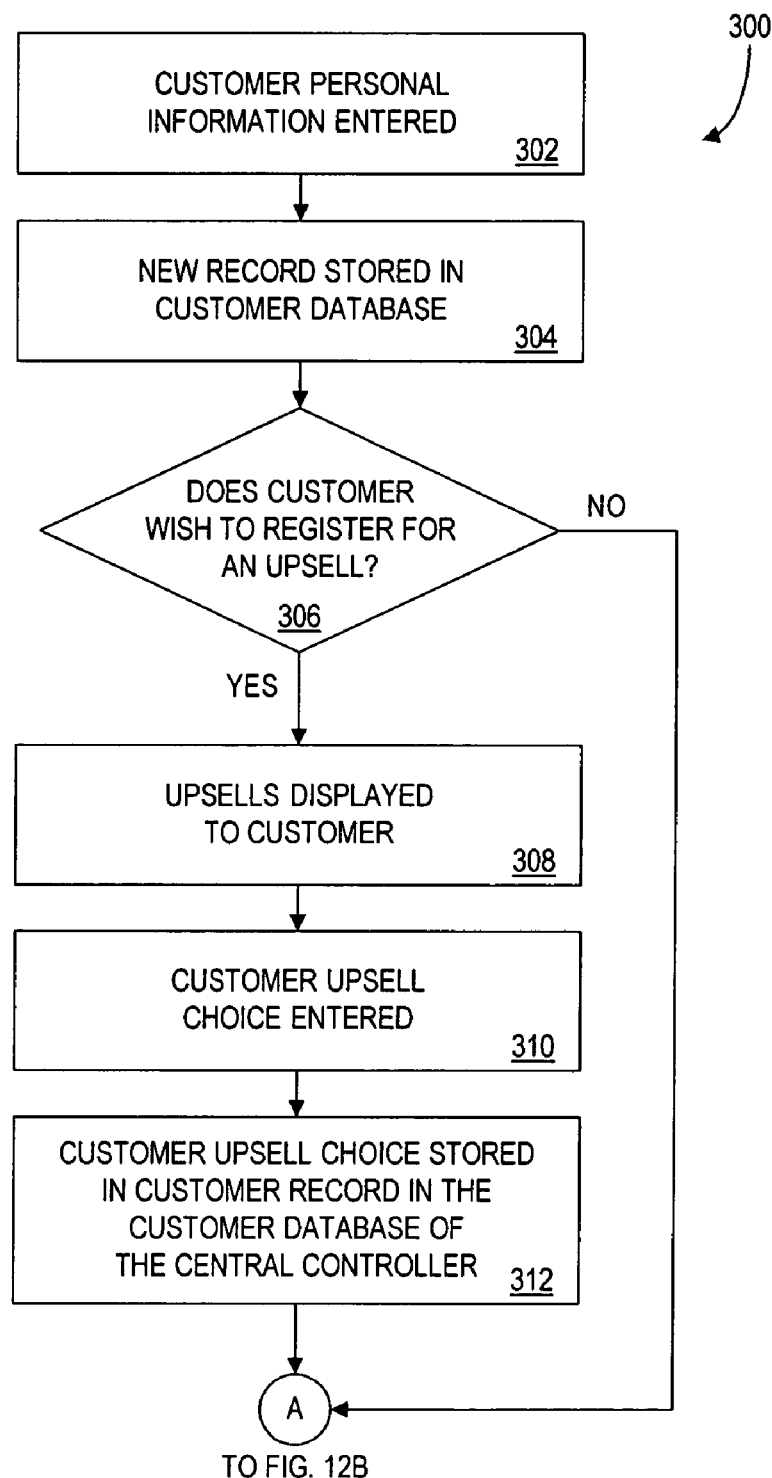
FIG. 12a is a flow chart illustrating a method of the present invention for storing customer preferences.
Figure 12B:
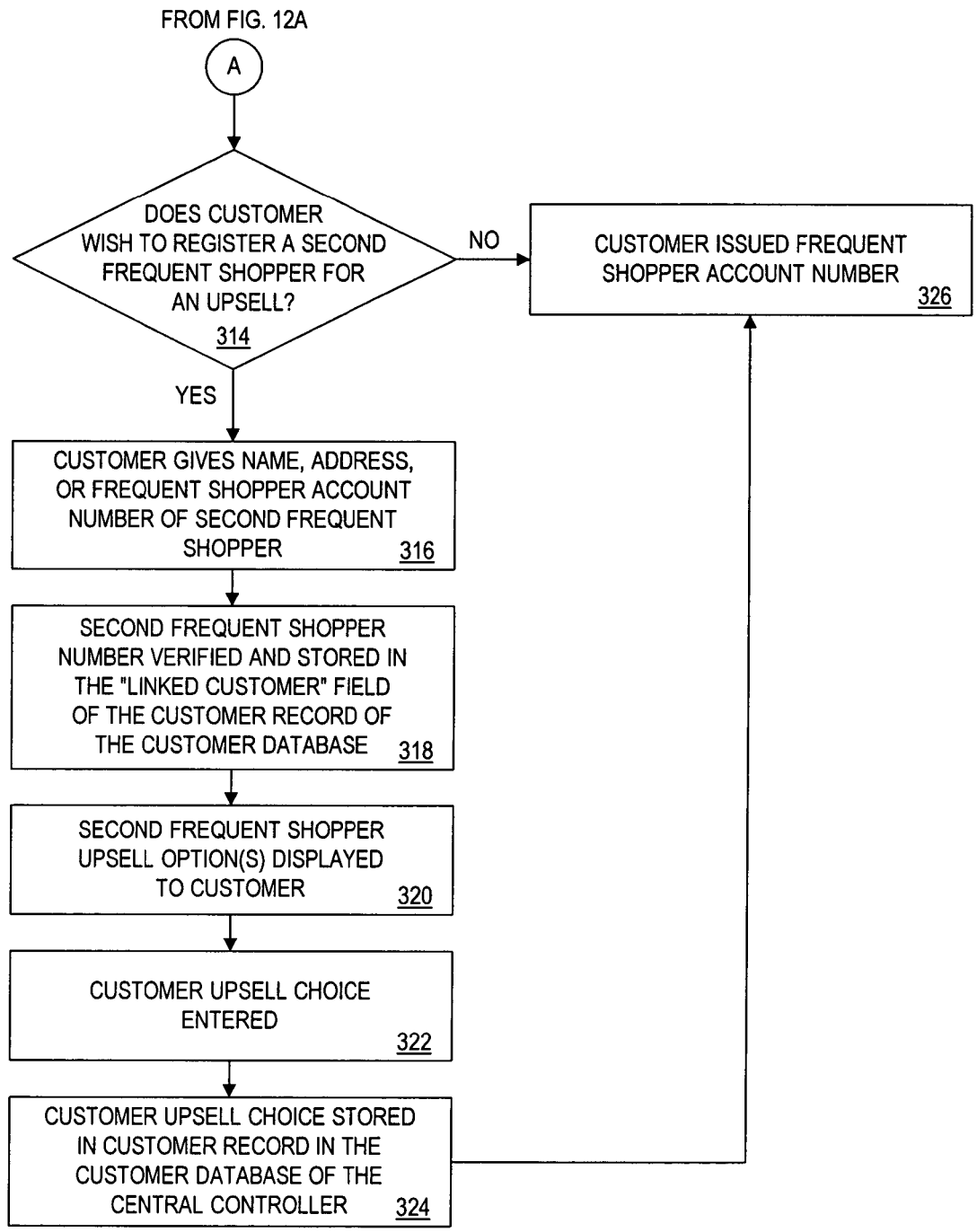
FIG. 12b is a flow chart illustrating a method of the present invention for storing customer preferences.

Referring now to FIGS. 12a and 12b, a process 300 is shown whereby automated upsell processing is performed for a customer having a frequent shopper card. A customer who wishes to register for a frequent shopper card which stores his preferences provides personal information (step 302), such as his name, address and/or telephone number, to a POS operator or other person who responsible for data entry. This personal information is then stored (step 304) in a record of the customer database. Such records are exemplified in FIG. 11 by the records 276 and 281 of the customer database 260.

The customer selects (step 306) if he would like to normally receive an upsell, rather than change. If he so selects, possible choices of upsells are displayed (step 308) to the customer. The customer chooses which of the displayed upsells he prefers to normally receive (step 310), and the chosen upsell is stored (step 312) in the historical preferences field 270 of his customer record.

The customer may also choose (step 314) if he would like to donate his upsells to a "linked" customer having a frequent shopper card. If so, the customer provides information (step 316) identifying the linked customer, such as the name, address and/or account number of the linked customer. The customer may select multiple other linked customers to receive donated upsells. The information is verified (step 318) to assure that the second customer may be properly identified from the information provided, and the information is stored in the customer database record. As necessary, additional customer records are created for second and subsequent customer(s).

Possible upsells to donate to the second customer are displayed (step 320) to the customer. The customer chooses which of the displayed upsells he prefers to normally transfer (step 322), and the chosen upsell is stored (step 324) in the customer record. Finally, the customer is issued his frequent shopper card (step 326) through which the POS terminal may identify his customer record.

Figure 13:
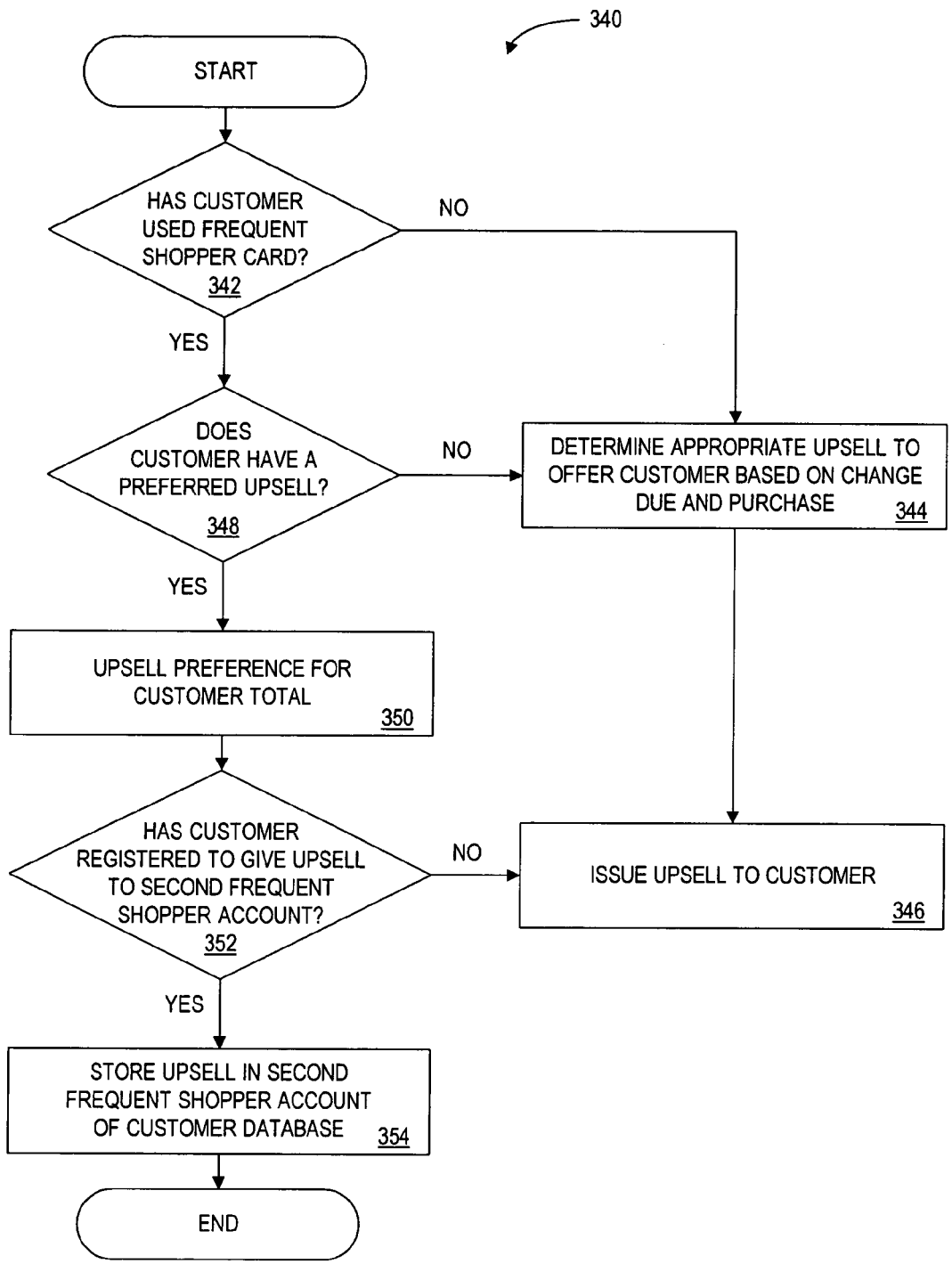
FIG. 13 is a flow chart illustrating a method of the present invention for applying previously-selected customer preferences.

Referring to FIG. 13, a method 340 for applying previously-selected customer preferences to a current visit to a POS terminal begins with a determination (step 342) of whether a frequent shopper card is being used. Such a determination may be made, for example, by receiving a signal from a card reader, thereby indicating that a card has been "swiped" through the card reader. If a frequent shopper card is not being used, an upsell is determined (step 344) as previously described, and an upsell (if selected) is provided to the customer (step 346) in exchange for his change.

If a frequent shopper card is being used, the customer database is searched to determine (step 348) if the customer has a preferred upsell. If he does, the preferred upsell is selected (step 350). The customer database is also searched to determine (step 352) if the customer has established a second customer to receive donated upsells. If so, an identifier for the selected upsell is stored (step 354) in an account of the second customer, thereby indicating that the second customer may receive the selected upsell. In other embodiments, the second customer may receive donated products that are not upsells, such as products bought for "list" price.

Figure 14:
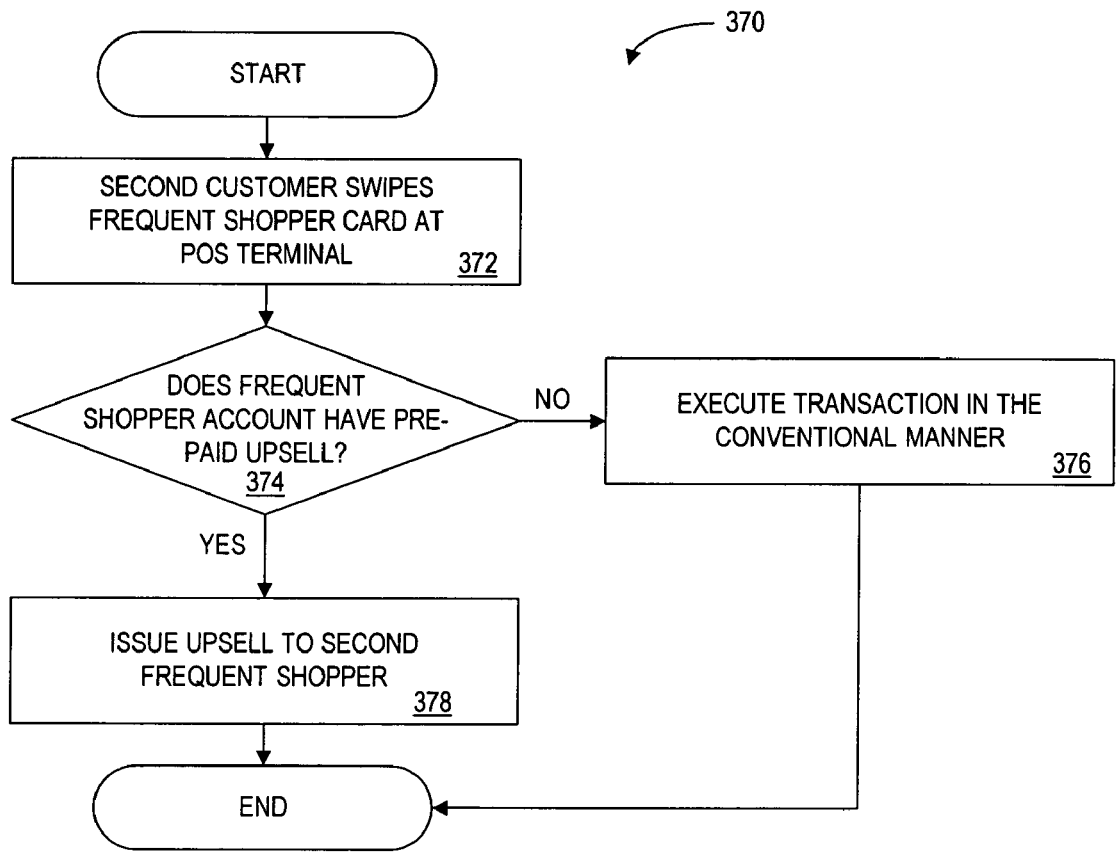
FIG. 14 is a flow chart illustrating a method of the present invention for receiving a donated upsell.

Referring now to FIG. 14, a method 370 illustrates how the second customer may receive the donated upsell. While at the POS terminal, the second customer swipes his frequent shopper card through a card reader (step 372), thereby identifying a customer record of the customer database providing information on his preferences and any upsells donated to him. The customer record is searched to determine (step 374) if an upsell has been donated to the second customer. If not, the second customer completes his transaction (step 376) at the POS terminal as described above. If an upsell has been donated, the second customer is informed and the upsell is provided (step 378), thereby clearing the donated upsell from the record of the second customer. A transaction-specific upsell, dependent on the change of the second customer, can be offered in addition to the donated upsell.

As described above, an upsell may have a corresponding expiration date after which the upsell may not be redeemed. For example, a donated upsell may be transferred only if the second customer collects the upsell through the above-described method 370 (FIG. 14) before a predetermined date. An expiration date for donated upsells is especially advantageous to a store in that it can increase customer retention by providing an incentive to visit the store having the POS terminals before the upsell expires. Breakage also provides the store with profit.

In many of the embodiments presented herein, the methods and apparatus of the present invention have been described in detail with respect to a single device functioning as a POS terminal, such as a cash register. However, as also described above, the functionality of the present invention may be implemented by a plurality of devices sharing the described functionality, such as the multi-unit system illustrated in FIG. 1*b*.

Figure 15:
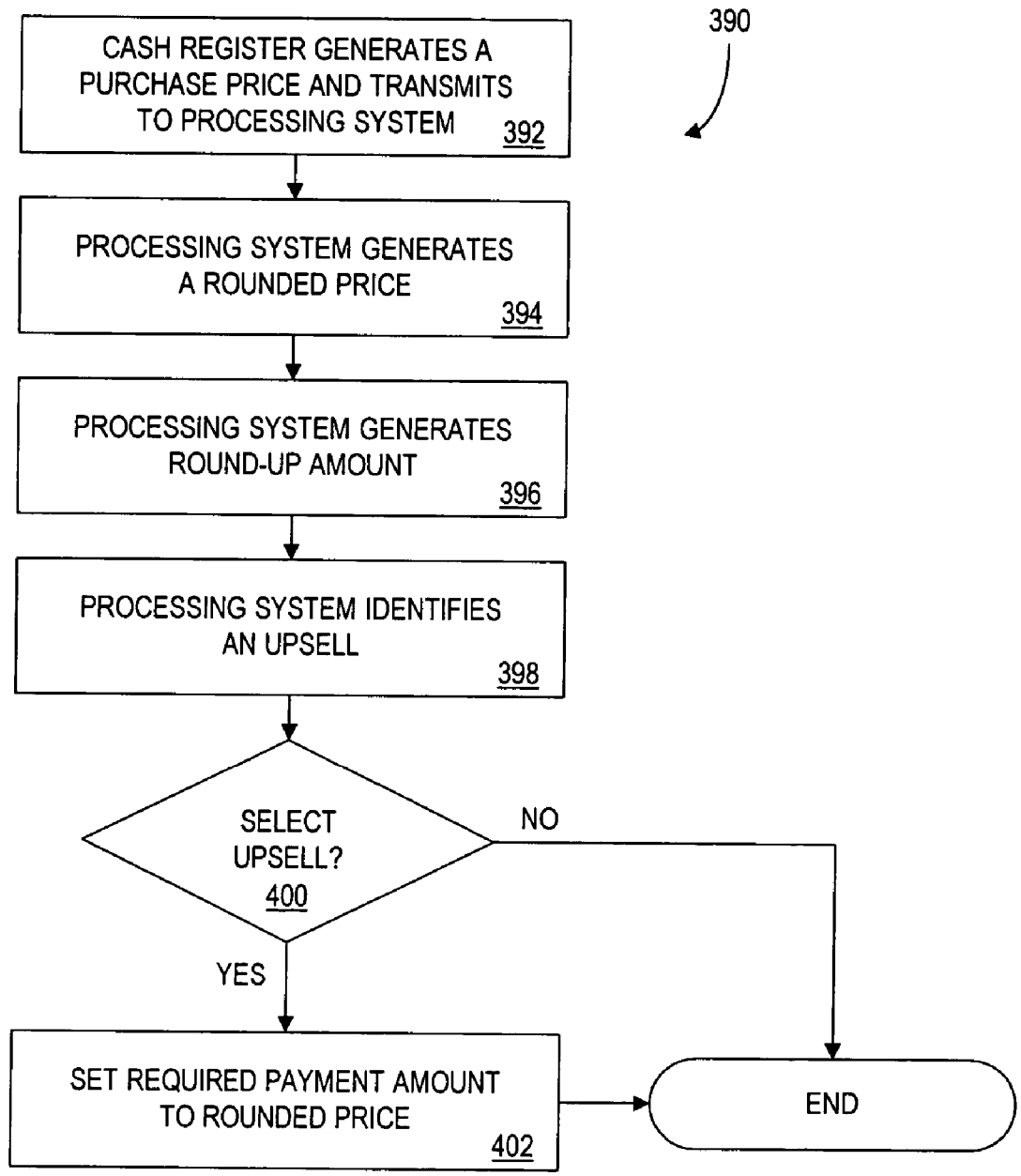
FIG. 15 is a flow chart illustrating another method of the present invention for determining an upsell at a POS terminal.

Accordingly, FIG. 15 illustrates a method 390 for determining an upsell at a POS terminal in accordance with the embodiment of FIG. 1*b*. The method 390 may be performed, for example, by a combination of a cash register and a processing system operated by an electronic marketing service or credit card clearing house. The cash register generates a purchase price and transmits the purchase price to the processing system (step 392).

The processing system generates a rounded price (step 394), and generates a round-up amount in dependence thereupon (step 396). As described above, the processing system identifies an upsell to offer to the customer (step 398). If the customer selects the upsell (step 400), then the required payment amount of the cash register is set, manually or automatically through a connection with the processing system to the rounded price (step 402).

It will be understood by those skilled in the art that many different systems may be provided wherein the functionality of the present invention is shared amongst multiple hardware and/or software devices.

Although the present invention has been described with respect to a preferred embodiment thereof, those skilled in the art will understand that various substitutions may be made to those embodiments described herein without departing from the spirit and scope of the present invention. For example, many other types of upsells that are not discussed in detail herein are contemplated by the present invention. One such upsell may comprise "points", such as those redeemable for store credit, telephone calls, Internet access or pay television events. Furthermore, many types of POS terminals, besides those requiring cashiers, are contemplated by the present invention.

We claim:

1. A method implemented by a device, comprising:
generating a purchase price of a purchase;
generating a rounded price;
calculating a round-up amount; the round-up amount being a difference between the purchase price and the rounded price; and
printing an entry in a lottery in which a prize for winning the lottery is proportional to the round-up amount.

2. The method of claim 1, in which generating the rounded price comprises:
rounding up the purchase price to a whole number.

3. The method of claim 1, in which generating the rounded price comprises:
calculating a lowest whole number that is greater than the purchase price.

4. The method of claim 3, in which the lowest whole number is a multiple of five.

5. The method of claim 3, in which the lowest whole number is a multiple of one.

6. The method of claim 1, further comprising:
exchanging the entry for the round-up amount.

7. An apparatus, comprising:
a processor; and
a memory storage device in communication with the processor,
the memory storage device storing a program which controls the processor to:
generate a purchase price of a purchase;
generate a rounded price;
calculate a round-up amount; the round-up amount being a difference between the purchase price and the rounded price; and
print an entry in a lottery in which a prize for winning the lottery is proportional to the round-up amount.

8. A method implemented by a device, comprising:
generating a purchase price of a purchase;
generating a rounded price;
calculating a round-up amount; the round-up amount being a difference between the purchase price and the rounded price; and
displaying an offer to exchange the round-up amount for an entry in a lottery in which a prize for winning the lottery is proportional to the round-up amount.

9. The method of claim 8, in which displaying the offer comprises:
displaying text explaining that the entry in the lottery may be purchased for the round-up amount.

10. The method of claim 8, in which displaying the offer comprises:
displaying text that identifies at least one of the round-up amount and the rounded price.

11. The method of claim 8, further comprising:
printing the entry.

12. The method of claim 8, further comprising:
receiving an input indicating acceptance of the offer.

13. The method of claim 8, further comprising:
determining a unique identifier that identifies the entry.

14. The method of claim 13, further comprising:
storing the unique identifier and the round-up amount in a database.

15. The method of claim 8, further comprising:
determining a value of the prize.

16. The method of claim 8, further comprising:
exchanging the entry for the round-up amount.

17. An apparatus, comprising:
a processor; and
a memory storage device in communication with the processor,
the memory storage device storing a program which controls the processor to:
generate a purchase price of a purchase;
generate a rounded price;
calculate a round-up amount; the round-up amount being a difference between the purchase price and the rounded price; and
display an offer to exchange the round-up amount for an entry in a lottery in which a prize for winning the lottery is proportional to the round-up amount.

* * * * *

UNITED STATES PATENT AND TRADEMARK OFFICE
CERTIFICATE OF CORRECTION

PATENT NO. : 7,587,334 B2
APPLICATION NO. : 10/625089
DATED : September 8, 2009
INVENTOR(S) : Walker et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this

Twenty-first Day of September, 2010

David J. Kappos
*Director of the United States Patent and Trademark Office*